A. F. RIETZEL & G. E. BARSTOW.
ELECTRIC CHAIN WELDING MACHINE.
APPLICATION FILED MAY 11, 1907.
1,040,760.
Patented Oct. 8, 1912.
9 SHEETS—SHEET 6.
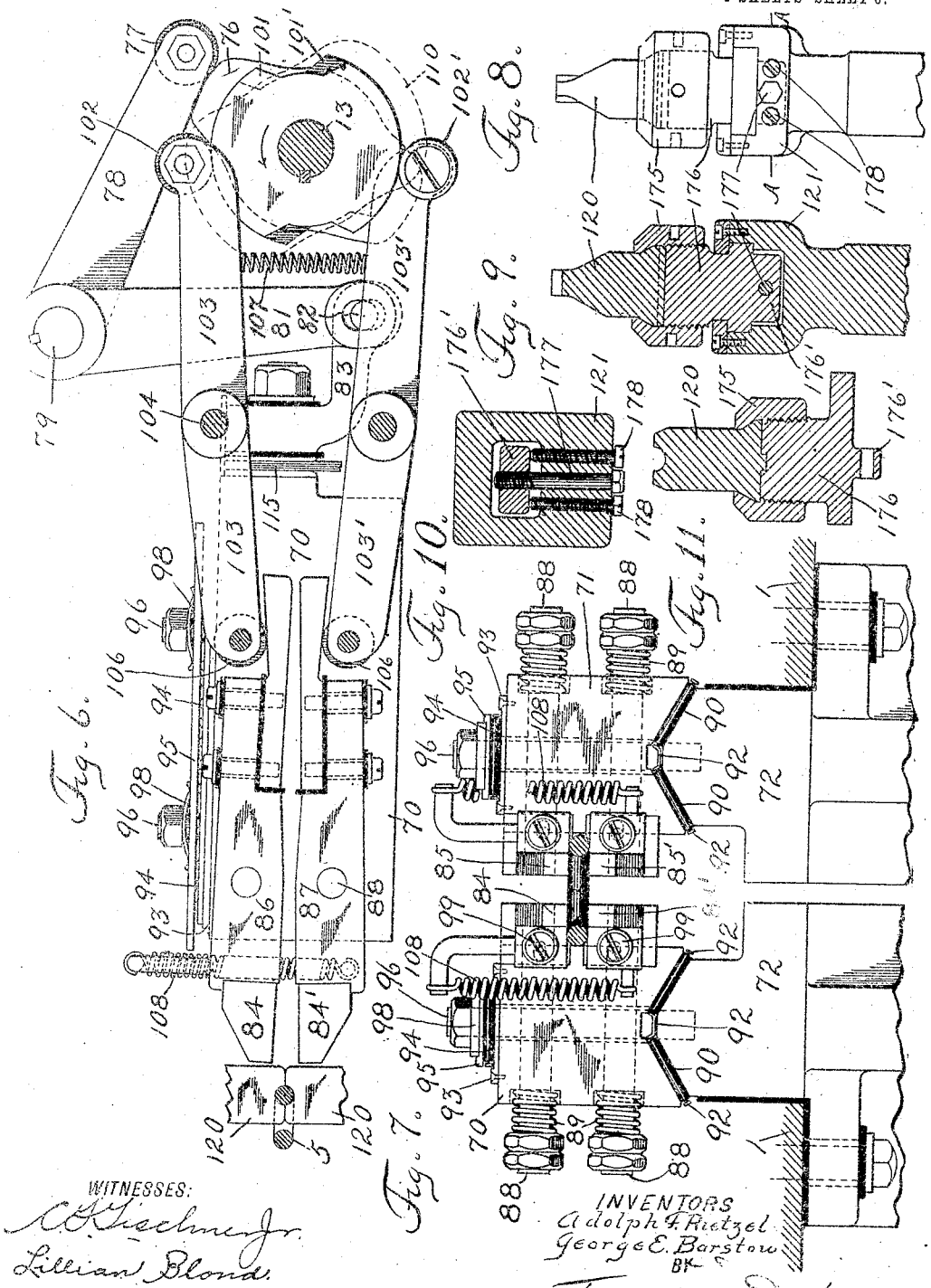

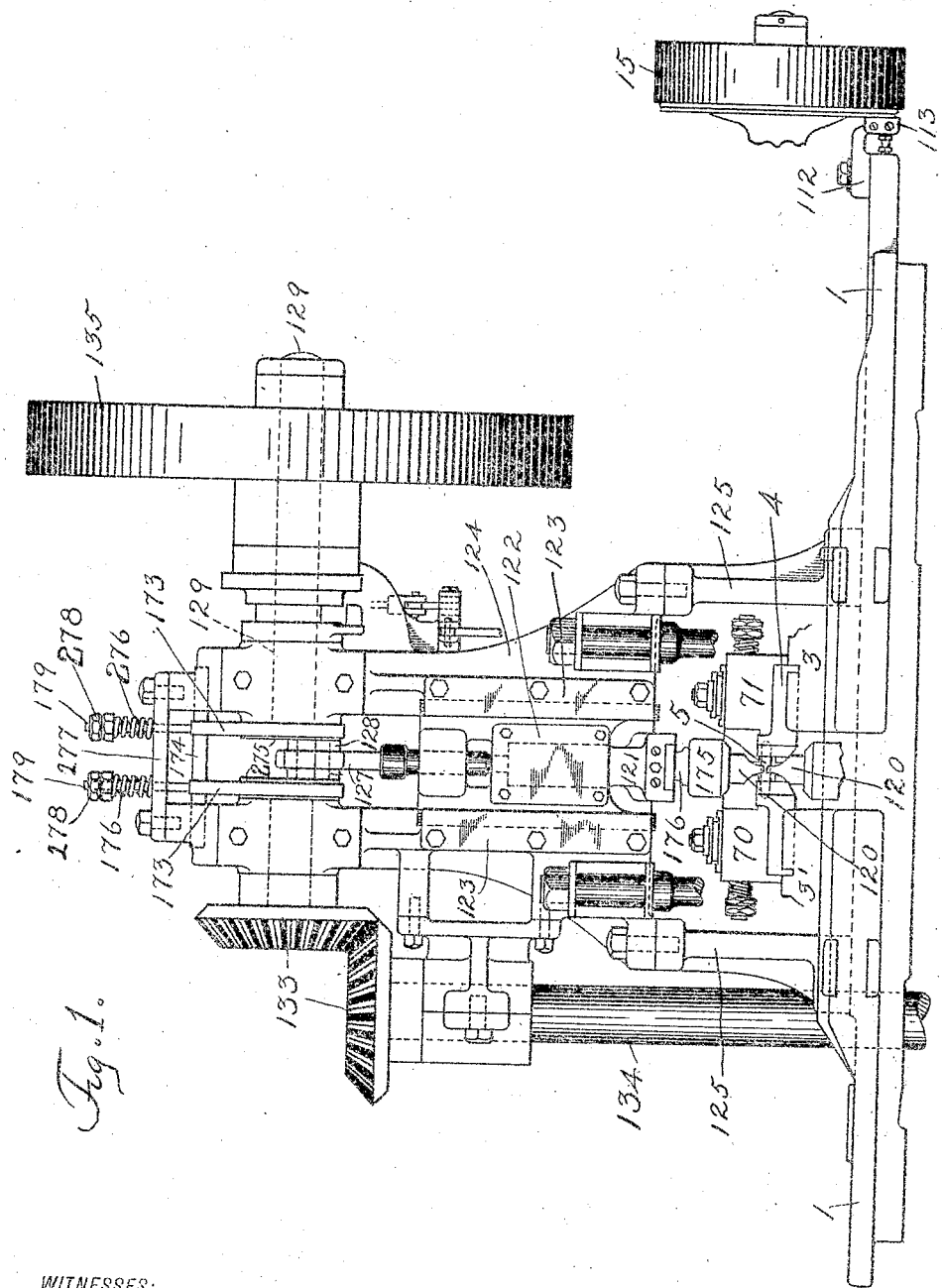

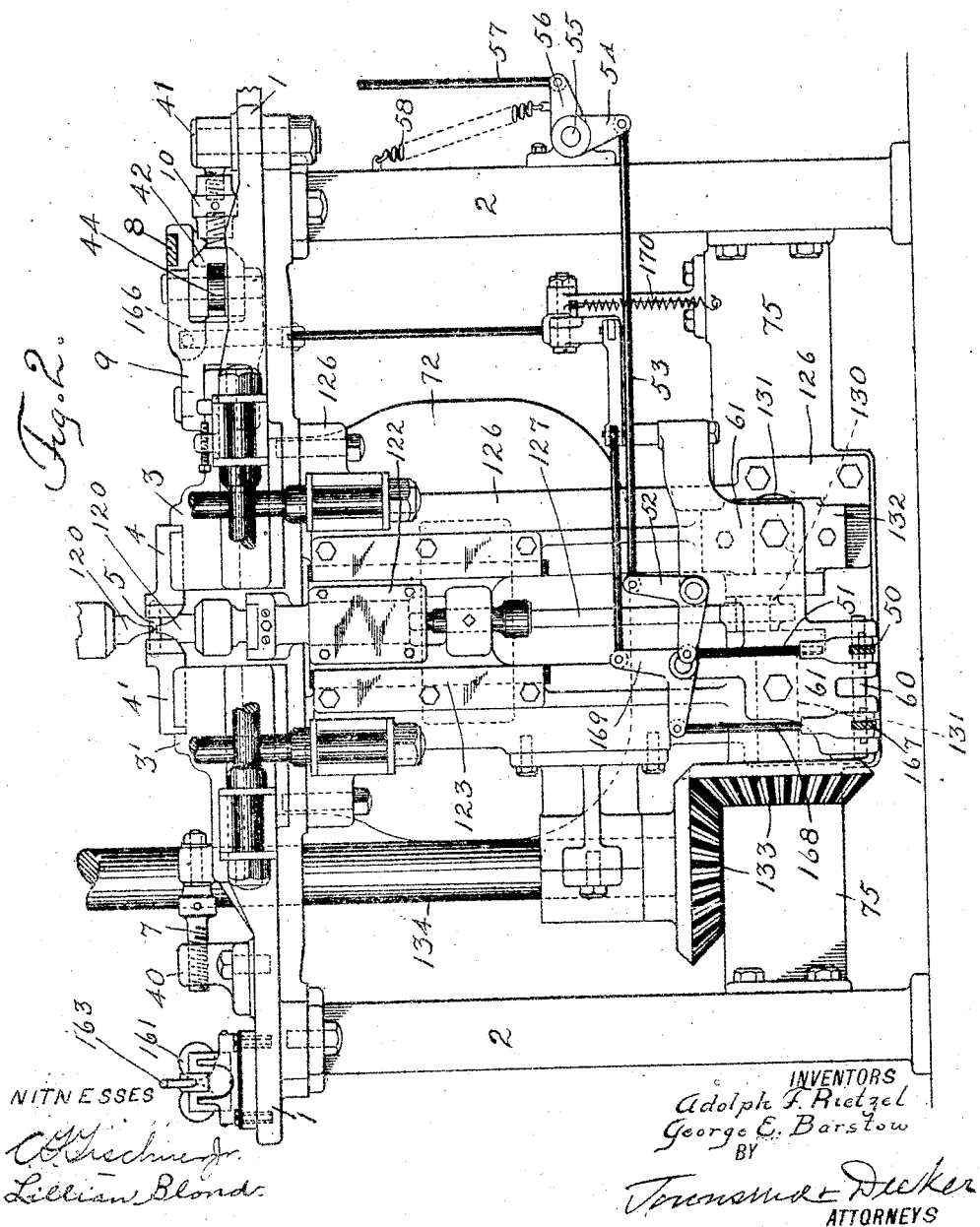

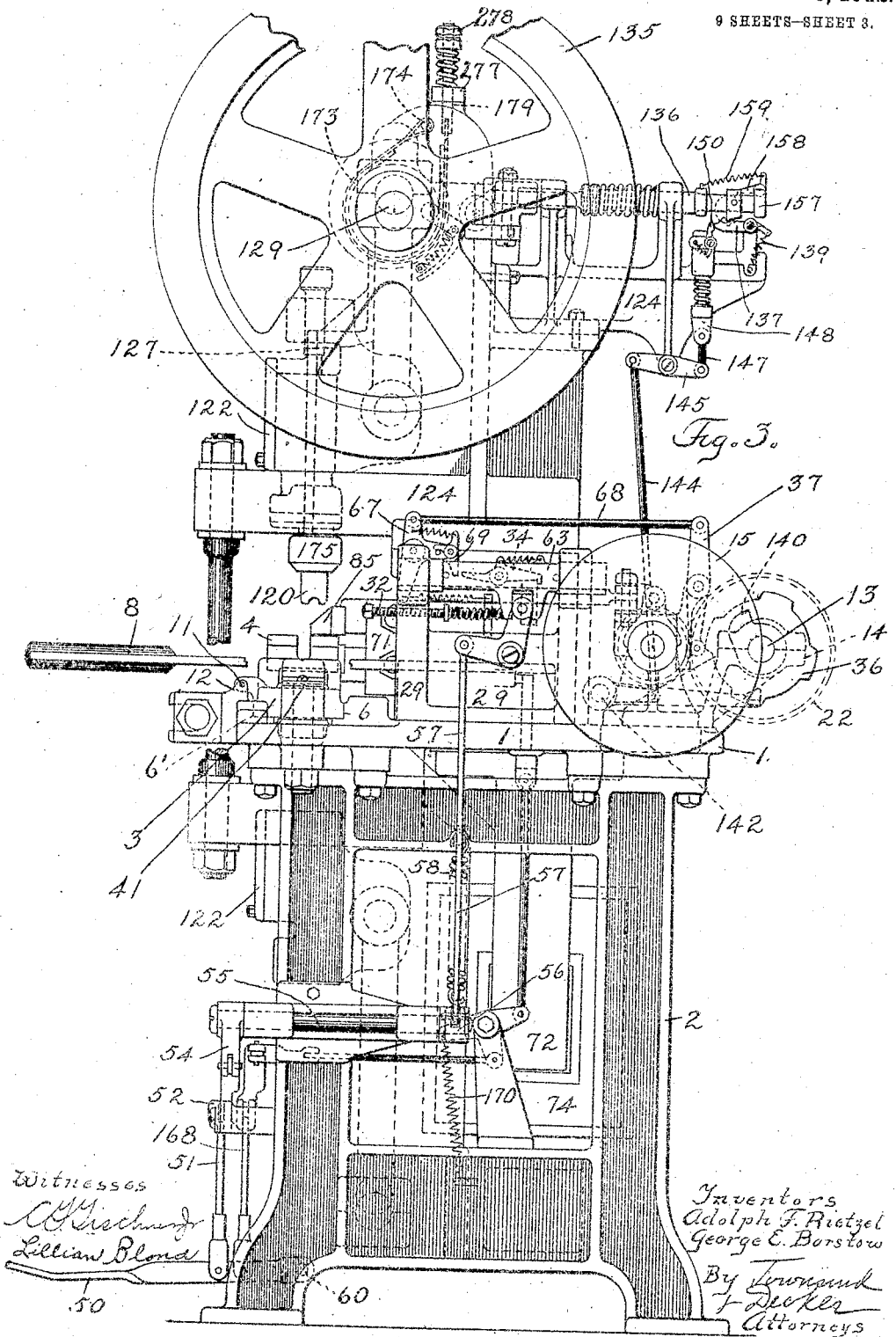

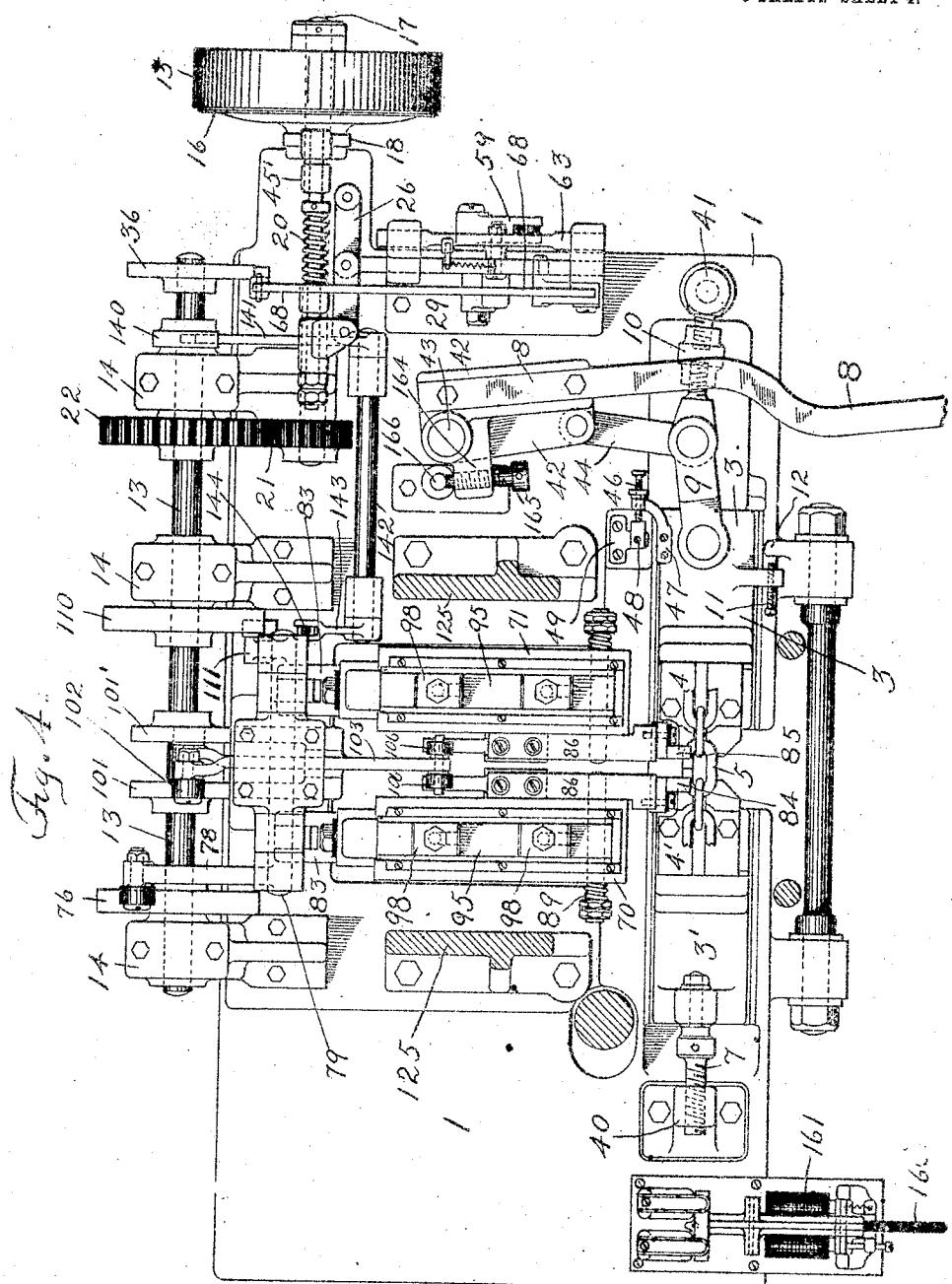

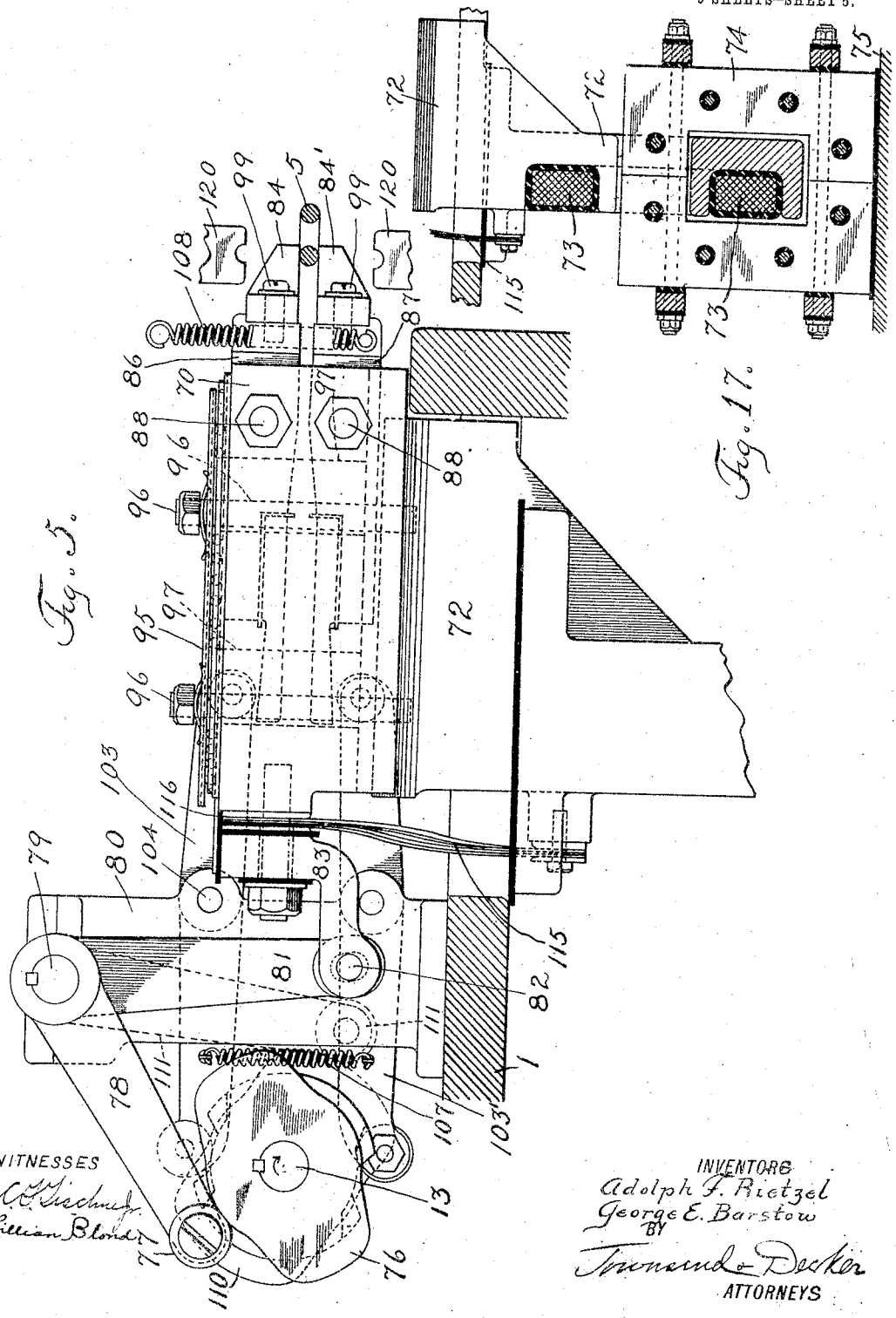

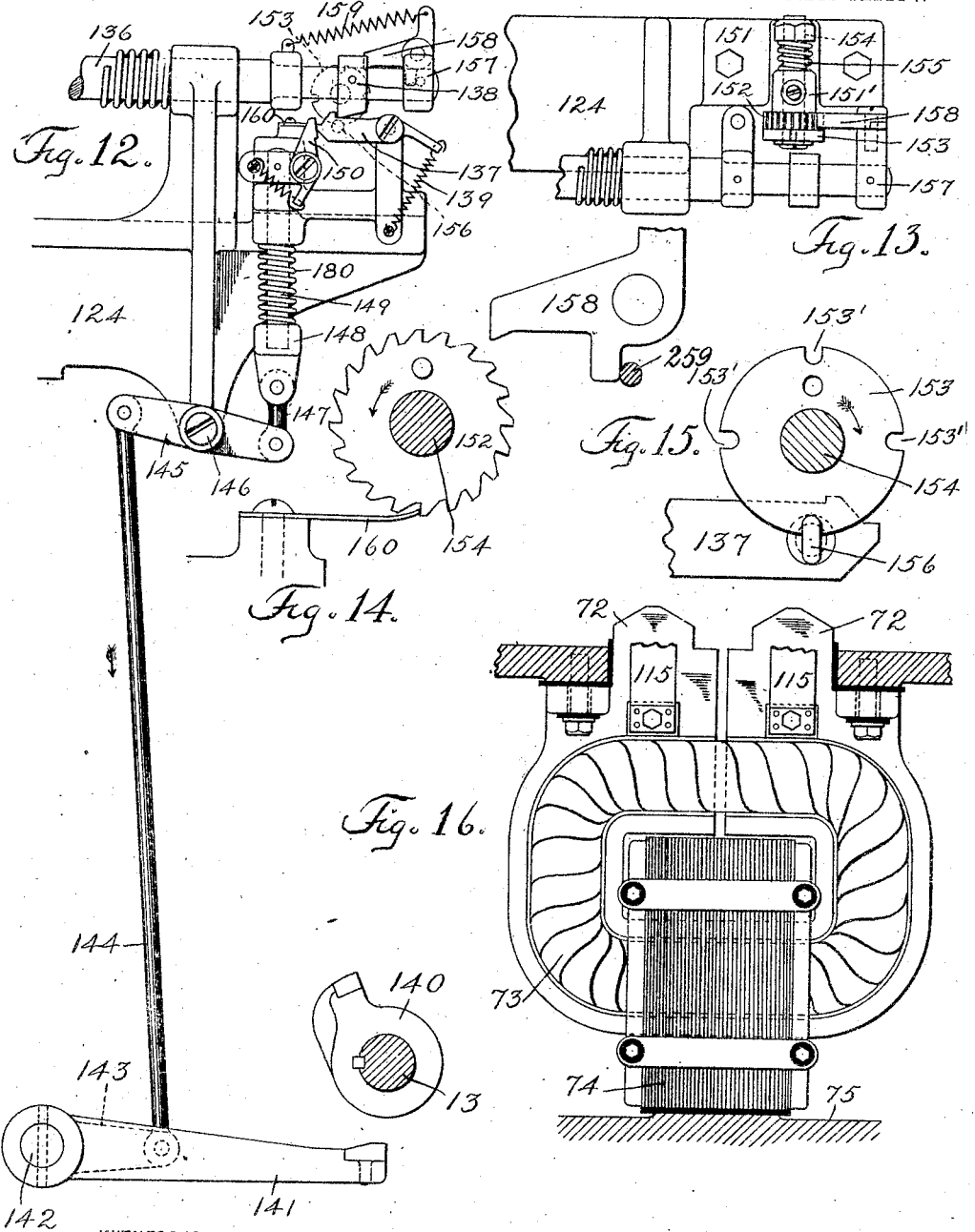

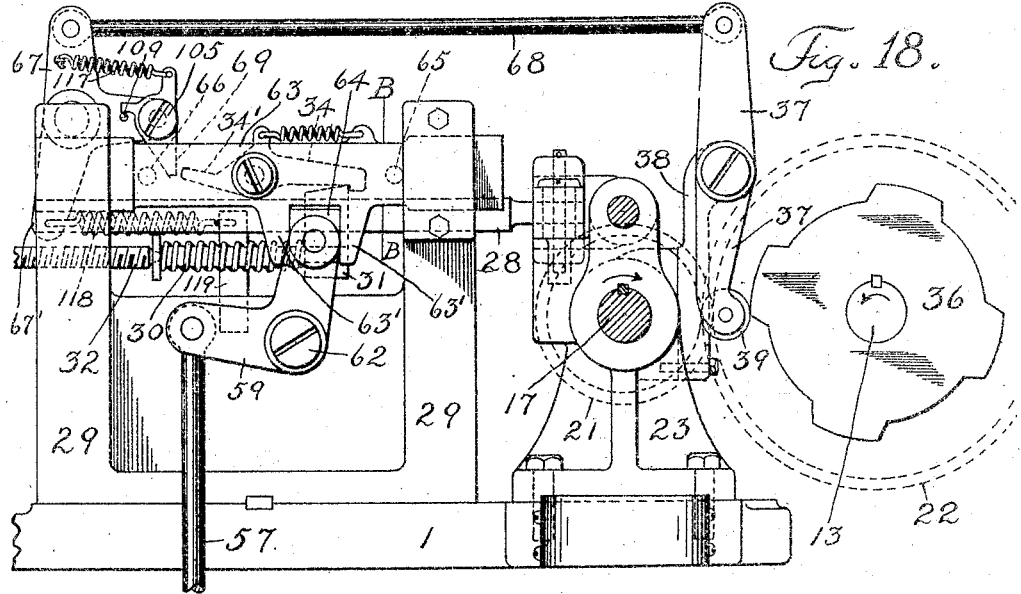
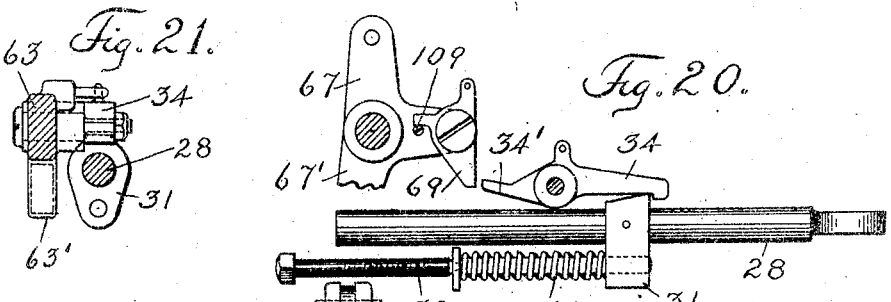
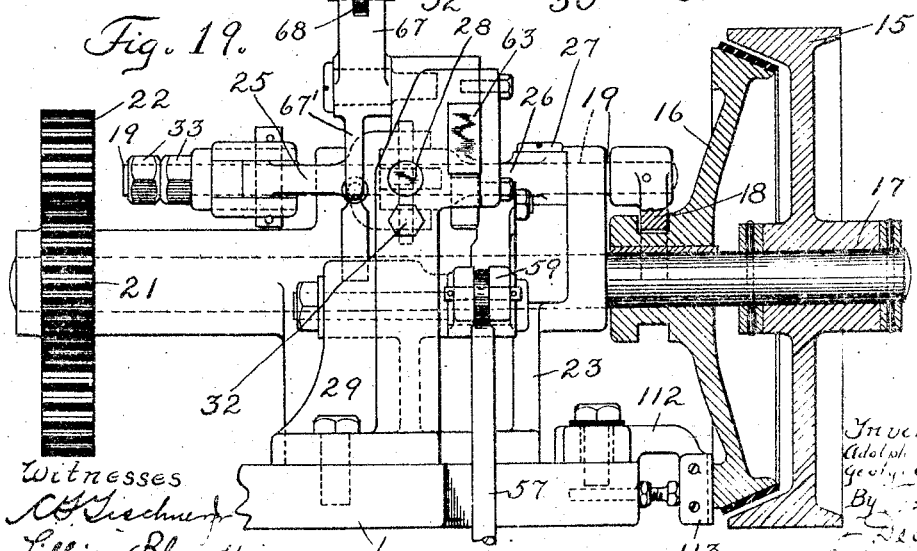

A. F. RIETZEL & G. E. BARSTOW.
ELECTRIC CHAIN WELDING MACHINE.
APPLICATION FILED MAY 11, 1907.
1,040,760.
Patented Oct. 8, 1912.
9 SHEETS—SHEET 9.
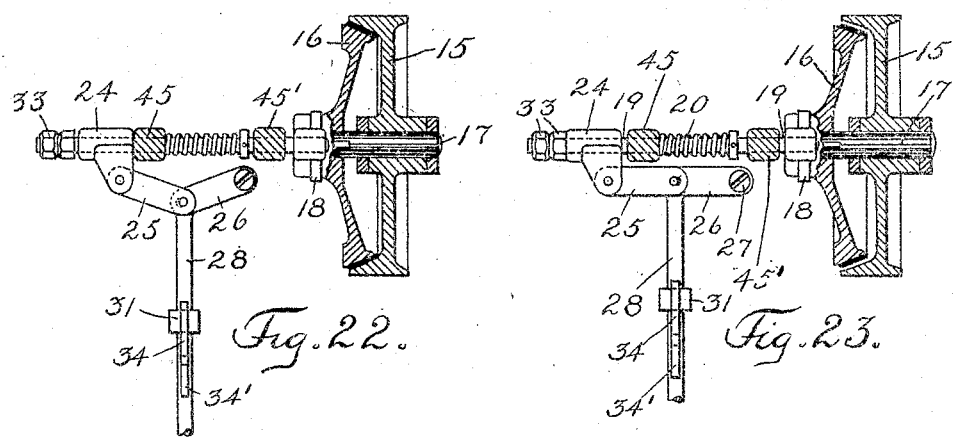
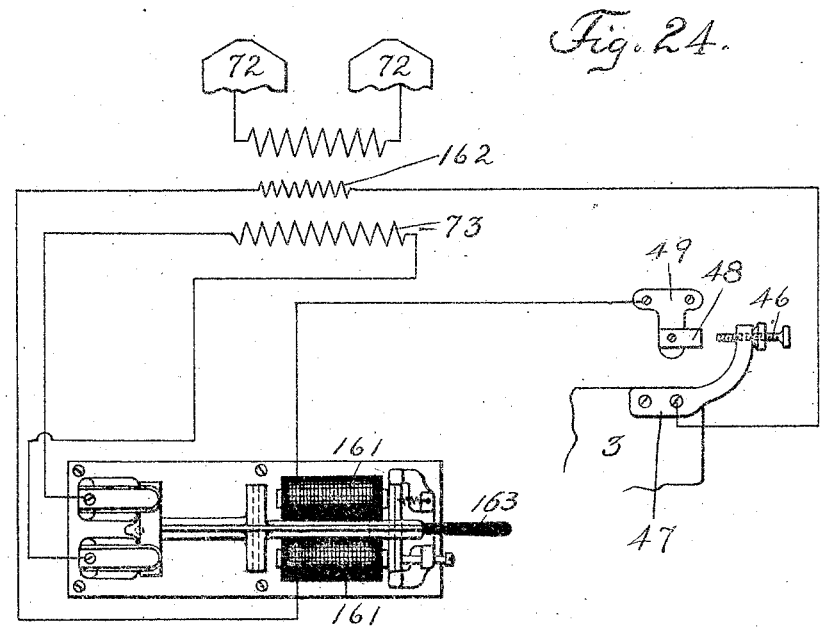
WITNESSES
INVENTORS
Adolph F. Rietzel
George E. Barstow.
BY
Townsend & Decker
ATTORNEYS

UNITED STATES PATENT OFFICE.

ADOLPH F. RIETZEL AND GEORGE E. BARSTOW, OF LYNN, MASSACHUSETTS, ASSIGNORS TO THOMSON ELECTRIC WELDING COMPANY, OF LYNN, MASSACHUSETTS, A CORPORATION OF MASSACHUSETTS.

ELECTRIC CHAIN-WELDING MACHINE.

1,040,760.

Specification of Letters Patent.    Patented Oct. 8, 1912.

Application filed May 11, 1907. Serial No. 373,081.

*To all whom it may concern:*

Be it known that we, ADOLPH F. RIETZEL and GEORGE E. BARSTOW, citizens of the United States, and residents of Lynn, in the county of Essex and State of Massachusetts, with post-office address Lynn, Massachusetts, have invented certain new and useful Improvements in Electric Chain-Welding Machines, of which the following is a specification.

Our invention relates to electric metal working apparatus wherein the work is heated to the desired extent by the passage of electric currents through the section of metal to be welded, forged or otherwise operated upon.

One of the objects of our invention is to provide a machine which shall at all times be under the control of the operator both to start and stop it but at the same time one which is capable of being automatically stopped at a predetermined period or periods in its cycle of operation.

Another object of our invention is to provide a re-heating of the work. The object of this part of our invention in the case of a welding operation is to insure a thorough union of the metal at its welded portion and to avoid the chance of imperfect union due to the fact that the upset in the metal may split and small cavities be formed therein which might not entirely be filled up by the operation of the forging tool. By re-heating and again upsetting the work the particles of metal become more closely united and a more perfect weld is obtained. Obviously the re-heating period could be dispensed with without departing from the spirit of our invention.

Another part of our invention consists in providing automatically operated reciprocating current-carrying jaws to supply heating current to the work and which are preferably adapted to close upon the work and form a firm surface contact therewith by spring pressure. These contacts may receive their heating current through a roller connection with the secondary of the transformer. They are also preferably constructed and operated to engage the work at diametrically opposite sides thereof.

Our invention consists further in providing contacts having sliding or roller bearing connections with their source of power with means to reduce sparking across these roller connections due to imperfect contact occasioned by dirt accumulating on the rollers, poor alinement, wear, etc. These means consist preferably of leads forming a shunt between the contacts and the secondary of the transformer.

Another part of our invention consists in providing a forging tool or implement with means whereby it will strike one or any number of predetermined blows upon the work before coming to rest.

Our invention consists further in providing means to insure the immediate stop of the forging tool when the actuating power therefor is released.

Our invention consists still further in providing means for immediately stopping the cam or master shaft when the power is uncoupled therefrom.

Our invention consists further in the special combinations of devices and mechanisms hereinafter described and then pointed out in the claims.

Our invention is especially useful for electrically welding chain links and will hereinafter be described as applied to an electric chain-welding machine but we do not limit ourselves to its use in this connection as the same might obviously be applied to various other forms of machines for doing different styles of work.

In the accompanying drawings, Figure 1 is a front elevation of the upper part of a machine embodying our invention. Fig. 2 is a front elevation of the lower part of a machine embodying our invention. Fig. 3 is a side elevation of the machine. Fig. 4 is a plan view of the table of the machine, the press and actuating parts having been removed. Fig. 5 is an enlarged side elevation of the reciprocating contact slides. Fig. 6 is a side elevation of the same looking at its opposite side. Fig. 7 is a front elevation of the same. Fig. 8 is a front elevation of the forging die. Fig. 9 is a vertical section of the same. Fig. 10 is a horizontal section taken on the line A A Fig. 8. Fig. 11 is a transverse vertical section of the same. Fig. 12 is an elevation of the press clutch release mechanism. Fig. 13 is a plan of the same. Fig. 14 is an enlarged elevation of part of the device for controlling the number of blows of the forging tool. Fig. 15 is an enlarged elevation of another part of the same device. Fig. 16 is a front elevation of the transformer. Fig. 17 is a vertical central section of the same. Fig. 18 is an enlarged side elevation of the power-clutch starting and stopping mechanism. Fig. 19 is a front elevation of the same. Fig. 20 is a detail of a part of the mechanism shown in Fig. 18. Fig. 21 is a transverse vertical section taken on the line B B Fig. 18. Fig. 22 is a plan and partial section of the part of the mechanism shown in Fig. 18, the same being shown in the position where the master shaft is coupled to the driving power. Fig. 23 is a similar view showing the master shaft released from the power. Fig. 24 is a diagram of the circuits of the machine.

1 indicates the main table or platform of the machine which is supported by the legs 2. The work, in the form of a chain-link 5 is placed between the work-holders 4, 4' in a horizontal position the broken edges or part to be welded being placed toward the rear of the machine. The link is clamped between the work holders 4, 4' by engaging with its curved ends as described in the prior patent granted to A. F. Rietzel for electric chain welding machine No. 783,543 and dated Feb. 28th, 1905. The work-holders 4, 4' are securely fastened to work-holder slides 3, 3' formed from suitable castings and adapted to slide in grooves 6, 6' formed upon the table 1. Preferably but one of the slides moves to clamp the work (namely the one on the right, indicated at 3) the slide 3' remaining stationary, but obviously the movable and stationary slides might be reversed or both might be movable. The position of slide 3' may be adjusted longitudinally, to allow the machine to take different sizes of work, by means of a set screw 7 mounted in a bracket 40 and swiveled in the end of the slide 3'.

The work-holder 4 together with the slide 3 is forced toward the opposite holder 4' by any suitable means, such as for instance by a toggle actuated as shown and described in the previously mentioned patent of A. F. Rietzel No. 783,543. This mechanism is typified in the present case by the secondary toggle (which moves the slide) made up of the moving member 9 jointed to the end of the slide 3 and the fixed member 10, the latter being pivoted at 41 to a boss rising from the table 1. This secondary toggle is actuated by the primary toggle composed of the members 44 and 42 of which 42 indicates a casting or block pivoted at 43 to a boss rising from the table 1, constituting the fixed member of the toggle and jointed to the secondary toggle by the flat link 44. Seated in a groove or otherwise suitably mounted upon the casting 42 is a long lever or toggle actuating handle 8. The secondary toggle is preferably adjustable, said adjusting being accomplished by constructing preferably the fixed member 10 as a turn-buckle. The return movement of the slide 3 is preferably positively but adjustably limited by the action of a set screw 11 mounted in a projection on the slide 3, said set screw coming into contact with a stop 12 rising from the table 1.

13 indicates the master-shaft mounted in suitable brackets 14 secured to the table 1 and upon which rotates the actuating means for the various mechanisms of the machine as will be hereinafter described.

Referring more particularly to Figs. 18 to 23 inclusive, 15 indicates a continuously rotating pulley mounted upon the counter-shaft 17 and forming the loose member of a friction clutch, hereinafter called the welder-clutch, the fast member or clutch disk being indicated at 16. The clutch disk 16 has a spline connection with the counter-shaft 17 but is capable of sliding thereon so as to engage with or be disengaged from the pulley 15. In the hub of the disk 16 is a groove in which the arms of a fork 18 mounted on a rod 19 engage with the hub to force the members of the clutch together through the action of a spring 20 compressed between a bearing 45 formed in the support 23, pushing against a collar pinned to the rod 19, and thereby the shaft 13 revolves by means of a gear 21 on the counter-shaft meshing with gear 22 on master-shaft. The counter-shaft 17 is mounted in bearings formed in a casting or support 23 said casting also providing bearings 45, 45' for the rod 19. On the rod 19 is a sleeve 24 to which one member 25 of the toggle is jointed. The other member or fixed member 26 turns on the pin 27 secured to a projection from the casting 23. The members of the toggle are connected to a rod 28 extending horizontally through bearings in a casting 29 supported upon the table 1 and are held in their straightened position by the action of a spring 30 compressed between a collar 31 secured to the rod 28 and a set screw 32 supported in a post of the casting 29 in which position of the toggle the member 25 forces the sleeve 24 against the nuts 33 on the end of the rod 19 and draws the clutch apart against the action of the spring 20. To permit the spring 20 to bring the members of the clutch together and thus start the master-shaft, the toggle actuating rod 28 is retracted by a catch 34 which engages a shoulder on the collar 31 by means of the following mechanism:—Referring to Figs. 2 and 3, 50 indicates a foot-lever mounted on a rod 60 journaled in bearings formed in a casting 61 secured to the framework of the machine. Pivotally mounted on the foot-lever 50 is the vertical pull-rod 51 pivoted to the horizontal arm of the bell-crank 52, the rod 53 forming a link connecting the vertical arm of the bell-crank 52 to a suitable arm 54 carried by a rock-shaft 55, said rock-shaft being mounted in bearings secured to the right leg of the machine. The other end of said rock-shaft 55 has attached thereto an arm 56 to which is pivoted the vertical pulling rod 57. A spring 58 tends to normally keep the rod 57 and therefore the foot-lever 50 in its upper-most position, in which position the clutch is uncoupled. The upper end of the vertical rod 57 is pivoted to one end of a bell-crank 59, (Figs. 18 and 19), said bell-crank being pivoted at 62 to a boss formed upon the side of the casting 29. 63 indicates a reciprocating bar moving in suitable guides formed in posts of the casting 29. Depending from the bar 63 are a pair of arms 63' between which a block 64 pivotally connected to an arm of the bell-crank 59 operates to draw back the bar 63, said bar being limited in its forward and rearward movement by the pins 65 and 66 respectively. Mounted upon a boss on the bar 63 and moving therewith is the catch 34 which engages the collar 31 of the toggle actuating rod 28. It will thus be obvious that by pressing the foot-lever 50 the bar 63 will be drawn to the left (Fig. 18) through the intervening mechanism and carrying the catch 34 with it the toggle-actuating rod will open the clutch-operating toggle and the master-shaft will start to revolve as previously described. It will here be noted that if the foot-lever is released the toggle actuating rod 28 will force the members 25 and 26 of the clutch operating toggle straight, through the coöperation of the springs 30 and 58 which action will separate the members 15 and 16 of the clutch as previously described.

Upon a bracket 112 secured to the table 1 is mounted some friction material such as a strip of leather 113 in such position that it will be engaged by the outer rim of the fixed clutch member 16 when the same has been drawn apart from its companion or power member 15. When the members of the clutch have become disengaged through the action of the clutch operating toggle, as previously described, the fixed member 16 or member through which the power is transmitted to the master-shaft will be forced against the leather 113 and immediately come to rest and thus avoid the danger of the master shaft continuing to revolve through the momentum which may have been stored up in the same and tending to carry it beyond the desired stopping position.

We will next describe the mechanism for feeding heating current to the work after which will be described the means for automatically stopping the revolution of the master-shaft. Referring more particularly to Figs. 4, 5, 6 and 7, the contact-carriers 70, 71 are disposed in parallel position one with the other and transverse to the axis of the master-shaft so that the contact-jaws or electrodes carried thereby will be in position to make contact with the work on either side of the break to be welded or portion of the metal to be otherwise worked and may be supplied with current from any suitable source to be conducted by them to the contact-jaws or electrodes, when the same are in their forward position and in contact with the work, as shown in Fig. 5. By preference we employ a transformer of the type and general construction shown and described in the aforementioned Patent No. 783,543, a brief description of which will suffice in the present case.

72, Figs. 16 and 17 indicates the secondary of a transformer, the same being split into two terminal blocks for the contact-carriers, the primary for which is indicated at 73 and the laminated core at 74. The secondary is insulated from and suitably secured to the under side of the table 1 by insulated bolts passing through lugs formed on the secondary 72. The laminated core 74 rests upon and is properly insulated from a supporting brace 75 mounted at either end upon a leg of the machine. The terminals of the secondary 72 pass up through a rectangular opening in the table 1, each terminal forming a wedge-shaped bearing-surface upon which the contact carriers travel.

The contact-carriers 70, 71 are constructed of large blocks of copper suitably grooved in their under surface to ride upon roller-bearings mounted in and carried by frames 92 and superposed upon the terminals of the secondary. The upper surfaces of the contact-carriers are provided with channeled plates 93 forming guide bearings for the upper set of roller-bearings 94. Superposed upon the roller-bearings 94 are bearing plates 95. Passing through the upper bearing plates 95 are the stud-bolts 96 one located at each end of the bearing plates and which pass through longitudinal slots 97 in the contact blocks and are firmly fastened in the terminals of the secondary 72. Over the upper ends of the studs 96, plate springs 98 are inserted and fastened by suitable nuts, thus keeping the contact-carriers pressed against the roller-bearings 90 and at the same time allowing a reciprocating movement of the carriers upon the bearings.

Mounted upon each of the contact-carriers on their inner sides are a pair of levers 86 and 87 carrying contact jaws or electrodes 84, 84' and 85 and 85' respectively. The levers 86 and 87 are fulcrumed upon studs 88 passing transversely through the contact carriers, said levers being held firmly against the sides of the carriers by springs 89 compressed between nuts upon the ends of the studs 88 and recesses in the outer sides of the carriers. Mounted upon the forward ends of the levers 86 and 87 are the contact jaws 84, 84', 85 and 85' said jaws being provided with horizontal slots through which the screws 99 pass and screw into the ends of the levers for mounting the jaws upon the same. By these means adjustment of the jaws or electrodes can be obtained longitudinally with regard to the work to vary the amount of metal to be heated that is, for larger sizes of work it is desirable to have a greater amount of metal between the electrodes.

Keyed to the master-shaft 13 and revolving therewith is a cam 101 which comes into engagement with the cam-roll 102 carried by one arm of a fulcrumed lever 103 (constituting a cam follower) pivoted at 104 to a boss in the side of a bracket 80, said bracket being supported upon the table 1 near the rear end thereof. The other arm of the lever 103 has mounted thereto a pair of rollers 106 which engage recessed projections at the rear ends of the upper right and left hand jaw operating levers 86. A similar mechanism is provided for operating the two lower contact jaw operating levers 87 and is carried into effect by the cam 101' acting on the cam-roll 102' of the lever 103'. A spring 107 connecting the upper and lower cam followers keeps the rollers 102 and 102' forced against their respective cams 101 and 101'. It will thus be seen that when cams engage the rollers 102 and 102' the jaws 84, 84', 85 and 85' will be open and free from the work as shown in Fig. 6. When the cam-rolls 102 and 102' drop into the recesses of the cams 101 and 101' the contact jaw-operating levers become free from the cam-following levers 103 and 103' and the contact-jaws are drawn together to engage the work by the pull of a tension spring 108 connecting the forward ends of the jaw operating levers as shown in Fig. 5. The cams 101 and 101' are preferably double cams, that is they each have two shoulders 180° apart so that the contact jaws will open twice during one revolution of the master shaft 13. The master-shaft also carries a cam 110 to push the contact-carriers forward so that the contact-jaws may engage the work. For doing this the following mechanism may be employed. A rock-shaft 79 mounted in suitable bearings in the bracket 80 has a cam follower in the form of an arm 111, terminating in the usual cam roll, keyed thereto in such manner that the roll is in engagement with the cam 110. Also mounted upon the rock-shaft 79 and keyed thereto is a pair of links 81 (one for each contact-carrier) connecting the rock-shaft with arms 83 secured to and extending from the rear of the contact-carriers 70 and 71. The arms 83 are preferably insulated from the contact-carriers and are pivoted to the arms 81 by loose pivotal connections indicated at 82. Upon the revolution of the master-shaft the cam 110 pushes the contact carriers, and therefore the contact jaws or electrodes, forward by rocking the shaft 79 which forces the links 81 forward through its connection therewith. Another cam 76 upon the master-shaft engages the roll 77 upon the cam follower 78 keyed to the rock-shaft 79 in a practically diametrically opposite position to the cam follower 111 and draws the contact-carriers back and away from the work in an obvious manner.

From the foregoing description it will be seen that the contact-carrying jaws or electrodes are forced out of contact with the work by rigid mechanical means whereas the contact is formed with the work by spring pressure thus insuring good contact between the work and the electrodes whether one piece of work be smaller or larger than the preceding. In other words, the contact jaws are self-adjustable transversely to the line of the work.

We do not confine ourselves to contact-jaws or electrodes wherein the two members of each are movable as, obviously, one might be stationary and the other movable to follow up and make contact with the work on a diametrically opposite side to the stationary one without departing from the spirit of our invention. It will also be noted that the right and left upper contact-jaws are opened by the one lever, while the two lower ones are operated simultaneously by a companion lever. These levers 103 and 103' are mounted stationary upon the machine whereas the contact-jaw carrying levers upon which they operate are movable.

In machines of this character where the current is transmitted to the work from the secondary of a transformer through roller bearings, there has been a tendency to spark around these rollers owing to the difficulty of procuring and maintaining a true rolling surface and also to dirt accumulating about the rollers, and all tending to a loss of current. We obviate this difficulty in the following manner:—At some convenient place on each terminal of the secondary of the transformer a flexible lead 115 is secured, the other end being connected to some suitable part of the contact-carrying blocks as at 116. This lead thus forms a shunt across the roller connections and reduces sparking across the same. While we have found that the use of such a shunt connection is advantageous, we do not limit ourselves to its use in this connection. The construction of this part of the machine in the manner herein shown and described is not claimed herein but forms the subject of claims in our application filed December 26th, 1908, Serial No. 469,189.

To automatically stop the master-shaft 13, a cam 36 is keyed thereon and provided preferably but not necessarily with four shoulders for reasons that will hereinafter be set forth. A cam-follower 37 for the cam 36 in the form of a lever is pivoted and mounted upon a bracket 38 supported by the casting 23 as clearly shown in Fig. 18. One arm of the lever or cam-follower 37 carries the usual cam-roll 39 which engages the cam 36 while the other arm is connected to the vertical arm of the bell-crank lever 67 through a link 68. The horizontal arm of said bell-crank lever carries a tripping device in the form of a dog 69 pivoted at 105 and adapted to be normally held against a stop 109 by the action of a spring 117. The tripping device or dog 69 is adapted to engage a rearwardly extending arm 34' of the catch 34 and trip the same as will presently be described. A third or supplementary arm 67' of the bell-crank lever has fastened thereto one end of a coil spring 118 the other end of which is secured to a post 199 rising from a suitable part of the casting 29, said spring always keeping the cam roll 39 pressed against the cam 36.

Normally, when the master-shaft 13 is at rest the cam-roll 39 is engaged by one of the shoulders on the cam 36 and the dog 69 is free from the catch 34 as shown in Figs. 18 and 20. By pressing the foot-lever 50 which causes the master shaft to revolve through mechanism as previously described, the cam 36 having revolved sufficiently, the cam-roll 39 drops into a recess on the cam 36 and the dog 69 is raised up clear of the upper surface of arm 34' of the catch 34, and is pulled over against the stop pin 109, by the spring 117 where it is in position to release the catch 34 from the collar 31 when the cam roll 39 reaches and rises upon the next shoulder on the cam 36, and thus separate the members of the clutch as previously described.

Having now described the manner in which the work is clamped in its holders, the mechanism for starting and stopping the revolution of the master-shaft and the devices for feeding current to the work, we shall now describe the mechanism for starting the press and the devices used for causing it to strike a predetermined number of blows upon the work. The press preferably consists of an upper and lower die or forging-tool which move simultaneously and are made up and mounted each in the same way so the same reference numerals will be applied to the like parts of each.

120 indicates the upper and lower dies or forging tool connected by a bushing 175 to a post 176 seated in a recess in a block 121 which is adjustably mounted in a head 122 working in guides 123. The said dies or forging-tools are readily removable as shown more clearly in Figs. 8, 9, 10 and 11 to allow the use of different forms of forging or other working tools to operate on the work. The die 120 is provided with a shoulder adapted to fit in a groove in the post 176 to prevent the die turning independent of the post and is adjustable transversely by screw 177 passing through the block 121 and secured to a lip 176' depending from the post 176. Set screws 178 may be used to set the post and attached die in any position to which it may be adjusted by operating the screw 177. The guides 123 for the upper press parts are fastened to a casting 124 mounted upon standards 125 rising from the table 1 and which also serves to carry the clutch operating mechanism. The guides for the lower press parts are fastened to a frame 126 fastened to and depending from the table 1 and secured at the bottom to the brace 75. The block 121 is reciprocated by a pitman 127 pivotally connected to the block 121 at the rear end thereof and the pitman for the upper press being actuated by a crank or eccentric 128 connected to shaft 129 mounted in bearings formed on the casting 124. The pitman for the lower press is actuated by a crank or eccentric 130 connected to shaft 131 mounted in bearings 132 secured to the front of the frame 126. Shaft 131 is positively geared to shaft 129 by bevel gears 133 and the upright shafting 134 and revolves therewith.

The shafts 129 and 131 normally are at rest and are set in motion by any suitable means as by a continuously revolving pulley 135 receiving its power from any suitable source and normally running free upon the shaft 129. The power from the pulley 135 is coupled with the shaft 129 and through the gears 133 to the shaft 131 preferably by a form of clutch shown and described in our prior patent for automatic electric metal working apparatus No. 821,061, dated May 22nd, 1906, said clutch coupling the power to the shaft 129 by the forward movement of reciprocating or clutch controlling rod 136 as described in the above mentioned Patent No. 821,061. Said forward movement or movement to the left is produced by the action of the coil spring surrounding said rod, which rod, like the rod 61 of said patent, operates upon the devices which permit the clutch to operate and couple the power to the operating shaft of the press. The release of the rod 136 in the present case is effected by operating a suitable catch or detent as will be presently described. The restoration of the rod to normal position by a movement to the right where it may be retained by said catch or detent, may be effected in the manner described in said patent in connection with the operation of the rod 61 described in said patent or in any other suitable manner.

173 indicates a friction band operating upon a suitable part of the press actuating shaft 129 as, for instance, the hub 275 one end of which is attached to a bar 174 supported in the upper part of the casting 124, the other end being drawn tightly around the hub 275 by the spring 276 compressed between a suitable cross-bar 277 and nuts 278 tapped on the end of a rod 179 the other end of which is fastened to the friction band 173, the whole acting as a brake to insure the immediate stopping of the press shaft 129 at the instant the power has been uncoupled therefrom.

Normally the rod 136 is prevented from moving by a pivoted catch or detent 137 holding a collar 138 fastened to the rod 136. The catch or detent 137 is suitably mounted upon a bracket rising from the casting 124 and held in its locking position against the collar 138 by means of a spring 139.

140 indicates the press controlling cam mounted upon the master-shaft 13 and adapted to strike a pivoted arm or lever 141 pinned to a rock-shaft 142 suitably supported upon the table 1. Pinned or otherwise fastened to the other end of said rock shaft 142 is another arm or auxiliary lever 143 pivotally connected to a vertical pulling rod 144. The upper end of the rod 144 is pivoted to one arm of a rocker 145 pivoted at 146 to the casting 124. 147 indicates a link pivotally connecting the other arm of the rocker 145 with a head 148 in which is mounted a rod 149 carrying a trip or dog 150 adapted to latch over a shoulder on the catch 137 in position to trip the same and release the rod 136. When the shoulder of the cam 140 hits the lever 141, the dog 150 is forced up and latches over the said shoulder on the catch 137 and at the same time a spring 180 is compressed between the head 148 and a suitable projection from the casting 124, so that after the shoulder of the cam 140 has released the lever 141 the spring 180 is free to act and draws down the dog 150 and trips the catch 137 which starts the press as previously described. It will thus be seen that the press is started by the spring 180 and not by a positive action of the cam 140. This is made necessary by the fact that between the time that the cam 140 engages the lever 141 and the time when the press-clutch is thrown in, the master-shaft 13 must be stopped, but not before the cam 140 is out of engagement with the lever 141.

If it is desired to have the press strike but one blow upon the work the mechanism as described above will be sufficient, but when it is desired to cause the work to be struck a number of blows before the press comes to rest, an additional device constructed as follows may be used: Secured to the casting 124 is a bracket 151 upon which is mounted a ratchet 152 and a blow-determining disk 153 the circumference of which is provided with a number of notches 153′. The ratchet and disk are loosely pinned together and freely mounted upon a shaft 154 keyed in a bearing 151′ on the bracket 151 and securely held together and against the bearing 151′ by a compression spring 155 compressed between the bearing 151′ and a nut upon the end of the shaft 154. A pin 156 extending laterally from the catch 137 normally rests in one of the notches 153′ of the disk 153 and holds the same and the ratchet 152 from rotating. Pivotally mounted upon a collar 157 secured to the rod 136 is a pawl 158 held against a stop 259 in position to engage the ratchet 152 by the spring 159.

When the clutch-controlling rod 136 is released by the dog 150 tripping the catch 137, the pin 156 is freed from the notch of the disk 153, the rod 136 moves forward carrying with it the pawl 158 which strikes a tooth of the ratchet 152 and revolves the same and the blow-determining disk pinned thereto. The pin 156 now rides upon the outer circumference of the disk 153 and when the rod 136 is returned it does not come to rest, but goes forward to again throw in the press clutch because the catch 137 is prevented from holding the collar 138 by the pin 156 riding upon the disk 153. Upon the forward movement of the rod 136 the ratchet and disk are revolved still further by the pawl 158 and this reciprocating movement is continued until the pin 156 drops into the next notch on the disk 153 when the catch 137 is permitted to lock the collar 138 and thereby hold the rod 136. A retaining pawl 160 is provided to prevent the backward revolution of the disk when free from the pin 156. It will thus be seen that the number of blows to be struck by the press depends upon the number of notches provided in the disk 153 and obviously the number of teeth of the ratchet will have to be an equal multiple of the number of notches in the disk. Therefore the fewer number of notches in the disk the greater number of blows will be struck by the press before coming to rest. That is a ratchet provided with 20 teeth and a disk with 4 notches will cause the press to strike 5 blows, and similarly a ratchet with 20 teeth and a disk with 10 notches will cause the press to strike two blows.

It will readily be seen that it is a simple matter to substitute ratchets and disks of any desired relation to each other so that any predetermined number of blows will be delivered to the work.

The current may be turned on manually in the type of machine shown although automatic devices may be employed for doing the same if the machine is properly modified in construction as will be understood in the art. Ordinarily the turning off of the current is a purely automatic action brought about by the movements of the parts at the instant the weld is completed.

The particular form of current controlling devices employed is immaterial, any devices adapted to be energized by the movement of the parts to break the circuit, and of which there are many well known in the art, may be employed. Preferably we prefer to employ in the present case a contact pin 46 mounted upon a support or carrier 47 secured to one of the pushing-up parts of the machine such as the slide 3 and adapted to make contact as soon as the work becomes heated sufficiently to become plastic and yield, so as to allow said contact to move, as well understood in the art. The contact-pin 46 is preferably adjustable in its support or carrier 47 to vary the point at which the current is cut off. The pin 46 closes the circuit by making contact with its coöperating member 48 mounted upon a support 49 fastened to and insulated from the table 1 or other suitable part of the machine. Included in the circuit closed by this device is an electro-magnet 161, said magnet being energized by current from a supplemental secondary winding 162 as well known in the art and as diagrammatically illustrated in Fig. 24. The heating current is turned on by closing the primary 73 of the transformer by means of a double pole circuit closer secured to the handle 163, preferably one such as shown and described in the prior application for patent of A. F. Rietzel for machine for electrically welding attachments to sheet metal utensils filed Nov. 8th, 1906, S. N 342,456.

The cam 36 is provided with four shoulders so that the master-shaft will stop revolving four times while making one complete revolution. This is done to allow the work to be re-heated and further upset after it has been welded or otherwise worked but we do not limit ourselves to a machine wherein this reheating period is used. When it is desired to utilize a re-heating period, the same may be carried out in the following manner: The casting 42 upon which the push-up lever or handle 8 operates is provided with a projection 164 in which is mounted an adjustable set screw 165 adapted to normally strike a vertical pin or stop 166 passing through an opening on the table 1. The lever 8 and therefore the work-holding slide 3 normally come to rest by the set screw 165 striking the stop 166 just as the circuit through the electro-magnet is closed and the current cut-off. To remove the stop 166 so that the work may be further upset, the operator presses a foot-lever 167 similar to the foot-lever 50 for starting the master-shaft and mounted in a similar manner to the casting 61. Upon pressing down this foot lever 167 it draws down the vertical pulling rod 168 pivoted thereto and pivotally connected at its upper end with the horizontal arm of a bell-crank 169. The vertical arm of the said bell-crank is connected through suitable links and levers to the stop 166 as shown. A spring 170 normally keeps the stop 166 in the path of the set screw 165. The set-screw 165 is adjustable to allow for different amounts of upset desired to be given to different styles of work.

The master-shaft 13 carries in all six cams:—Two cams, 110 and 76 for pushing forward and pulling back the reciprocating contact-carriers; two cams 101 and 101' for opening the upper and lower contact-jaws or electrodes, the press clutch releasing cam 140 and the welder clutch releasing cam 36.

If no re-heating of the work is desired, but two shoulders would be necessary on the welder-clutch releasing cam 36 and one shoulder on all the other cams. This construction of cams will give one complete cycle of operations of the machine per one complete revolution of the master-shaft. However, by eliminating the re-heating period, the amount of work turned out per revolution of the master-shaft may be doubled, that is two complete cycles of operation can be obtained per one complete revolution of the master-shaft. To obtain this latter result, the welder-clutch releasing cam would retain the four shoulders as shown, the cams operating the contact-carriers and jaws would be double, as shown, and the press-clutch releasing cam would have two shoulders 180° apart.

The general operation of the machine will now be described, starting with the work-holding slide 3 drawn back with the set-screw 11 against the stop 12, the contact-jaws or electrodes open and drawn back out of the plane of the work and the master-shaft stopped, the welder-clutch releasing cam 36 being in the position shown in Fig. 18, the cams for operating the contact-carriers and contact jaws or electrodes as shown in Fig. 6 and the press-clutch releasing cam in the position shown in Figs. 3 and 12.

The work is placed in the work-holder 4', the slide 3 is drawn up by lever 8, the work-holder 4 grips the work and the lever 8 is further drawn up until the broken ends of the work are in good contact. The operator presses the foot-lever 50 which releases the welder clutch actuating spring 20 and the members of the clutch are forced together, thus causing the master-shaft 13 to revolve as previously described. As soon as the master shaft begins to revolve the cam 110 pushes the contact-carriers 70, 71 forward and the contact-jaw carrying levers 86 and 87 are released by action of the cam rolls of the operating levers therefor dropping into the recesses on the cams 101 and 101' and the electrodes 84, 84', 85, 85' are brought into contact with the work by action of springs 108. Upon revolution of the master-shaft, the cam roll 39 of the cam-follower 37 drops into a recess of the cam 36 which brings the dog 69 upon the arm 34' of the latch 34 in position to trip the said catch and uncouple the clutch as previously described. As soon as the electrodes make contact with the work, the cam roll 39 is engaged by a shoulder on the cam 36, the catch 34 is tripped and the master-shaft is stopped. The double pole switch having been closed by means of the handle 163 of the automatic switch, which is done preferably before, but may be done after the electrodes make contact with the work, current is now supplied to the work the master shaft in the meantime retaining its position, so that the mechanism cannot pass on to that stage of the cycle of operations at which the electrodes would be otherwise withdrawn and interrupt the current supply. This position is maintained until the shaft is again coupled to the driving power at the will of the operator by again depressing the foot lever 50, the latter having in the meantime been permitted to again rise so that the catch 34 again latches over the collar 31. It is therefore within the power of the operator to prolong or control the total duration of heating or to control at will any other operation taking place at this stage of the operation of the machine when the automatic stoppage of the action of the machine takes place and to delay at will the resumption of the automatic actions. Heating having taken place sufficiently the operator again depresses the foot lever to cause the machine to resume its cycle of automatic operations. When, however, the machine is provided with devices manually operated for upsetting as described, he may first operate the lever 8 to upset the work. When the lever 8 is so operated and it is provided with the attachments described, the flow of heating current will be interrupted by the contact pin 46 closing the circuit of the magnet 161, thus opening the switch. The apparatus having been permitted to resume its cycle of actions by depressing the lever 50, the master shaft causes the cams 101 and 101' to operate the levers 86, 87 and open contact jaws immediate after which the cam 76 draws the contact-carriers 70, 71 back. While the contact-carriers are drawn back, the press-clutch releasing cam 140 strikes the arm 141 and compresses the spring 180. Upon further revolution of the master-shaft the arm or lever 141 is released from the cam 140 and the press-clutch is actuated and the press starts its operations. At the instant the cam 140 releases the lever 141, the cam-roll 39 hits the next shoulder on the cam 36 and the master-shaft stops. After the press has finished its operations the master-shaft is again caused to revolve (by the operator pressing the foot lever 50 which in the meantime has been again released by him) and the electrodes are brought into contact with the work as previously after which the master-shaft again stops, the cam-roll 39 having been engaged by another shoulder on the cam 36. The current is now fed to the work again, by closing the circuit as before. During this re-heating period the operator is compelled to hold the circuit closed by the handle 163 as the members 46 and 48 of the circuit breaker are in contact and the electro-magnet 161 is actuated, which would cause the circuit to be broken if it were not held closed by the operator. The operator now presses the foot-lever 167 which takes the stop 166 out of the path of the set-screw 165 and allows the work to be further upset. In this operation the co-operating member 48 of the circuit closer yields, being made as usual in the art, as a spring. After the work has been sufficiently further up-set, the operator allows the circuit to be broken (by releasing the handle 163) and again presses the foot-lever 50 when the electrodes are freed from the work and drawn back after which the master-shaft again stops and the cycle of operations is complete.

From the foregoing description it will be obvious that the foot lever within the reach of the operator is simply the intermediary which may be operated at will to bring about the action of the devices by which the mechanism is restarted after it has been brought to rest at an intermediate stage of its automatic actions and in the following claims therefore the term "treadle" is to be understood as including any suitable device within the operator's reach.

What we claim as our invention is:

1. In an electric metal working machine, the combination with mechanism for supplying current to the work, a master shaft controlling the times of operation of said mechanism, a clutch, a treadle, a catch through which the treadle operates to cause the clutch to couple the master shaft to the driving power and means for disengaging said catch at predetermined points in the movement of the master shaft.

2. In an electric metal working machine, the combination with mechanism for supplying current to the work, of a master shaft controlling the times of operation of said mechanism, a clutch, a treadle and means connected therewith operating on said clutch to couple the master shaft to the power, and mechanism controlled by said master shaft for freeing the clutch from the influence of the treadle.

3. In an electric metal working apparatus, the combination with mechanism for supplying current to the work, of a master shaft controlling the times of operation of said mechanism, means for automatically disconnecting the master shaft from its driving power and independent means for coupling and uncoupling the shaft from its power independent of the position of said shaft.

4. In an electric metal working apparatus, the combination of a master-shaft, a power clutch therefor, a treadle and means connected therewith for coupling the master-shaft to the power, current-carrying jaws normally free from the work, means controlled by said master-shaft for causing said current-carrying jaws to engage the work and mechanism controlled by said master-shaft for freeing the clutch from the influence of the treadle after the current-carrying jaws have engaged the work.

5. In an electric metal working apparatus, the combination of a master-shaft, a power clutch therefor, a treadle and means connected therewith for coupling the master-shaft to the power, current-carrying jaws adapted to engage the work, means controlled by said master-shaft for causing said current-carrying jaws to be drawn out of engagement with the work and mechanism controlled by said master-shaft for freeing the clutch from the influence of the treadle after the current-carrying jaws have been removed from the work.

6. In an electric metal working apparatus, the combination of a press, a master-shaft, a power clutch for said master shaft normally disengaged from the power, a treadle and means connected therewith for coupling the master-shaft to the power, current-carrying jaws adapted to engage the work, means controlled by said master-shaft for causing said current-carrying jaws to be disengaged from the work, press controlling means controlled by said master-shaft and mechanism controlled by said master-shaft for freeing the clutch from the influence of the treadle after the press-controlling means have acted.

7. In an electric metal working apparatus, the combination with a master-shaft, of a clutch for coupling the master shaft to the driving power and normally disconnected as to its members, means for connecting said clutch members, current-carrying jaws normally out of line with the work, means for advancing said current-carrying jaws into line with the work, means for causing said current-carrying jaws to engage the work and means for automatically disconnecting said clutch members after current-carrying jaws have engaged the work.

8. In an electric metal working apparatus, the combination with a master-shaft, of a clutch for coupling the master shaft to the driving power and normally disconnected as to its members, means for connecting said clutch members, current-carrying jaws adapted to be advanced and engage the work, means for freeing said jaws from the work, means for retracting said jaws out of line with the work and means for automatically disconnecting said clutch members after the current-carrying jaws are out of line with the work.

9. In an electric metal working apparatus, the combination of a master shaft and contacts controlled thereby, adapted to engage and feed current to the work, means for automatically bringing said master shaft to rest as soon as the contacts engage, means controlled by the yielding of the metal for automatically cutting off the flow of current while the contacts remain engaged and means for subsequently re-starting the master shaft at the will of the operator to withdraw the contacts.

10. In an electric metal working apparatus, the combination with the mechanism for supplying current to the work, of a master shaft controlling the operation of said mechanism, a clutch, a treadle, a catch through which the treadle operates to cause the clutch to couple the master shaft to the driving power and a trip for said catch as and for the purpose described.

11. In an electric metal working apparatus, the combination of mechanism for supplying current to the work, a master shaft controlling the operation of said mechanism, a clutch, a treadle, a catch through which the treadle operates to cause the clutch to couple the master shaft to its driving power and a trip for said catch controlled by said master shaft, as and for the purpose described.

12. In an electric metal working apparatus, the combination with the mechanism for supplying current to the work, of a master shaft controlling the operation of said mechanism, a clutch, a treadle, a catch through which the treadle operates to cause the clutch to couple the master shaft to its driving power and a trip normally free from said catch and adapted to engage said catch by the action of said master shaft, as and for the purpose described.

13. In an electric metal working apparatus, the combination with the mechanism for supplying current to the work, of a master shaft controlling the operation of said mechanism, a clutch whose members are normally disengaged from one another, a treadle, a reciprocating bar connected to said treadle and a pivoted catch mounted on said bar through which the treadle operates to cause the clutch to couple the master shaft to the driving power, as and for the purpose described.

14. In an electric metal working apparatus, the combination with the mechanism supplying current to the work and a master shaft controlling the operation of said mechanism, of a clutch whose members are normally disengaged from one another, a treadle and means connected therewith for bringing said members into engagement to couple the master shaft to the driving power, a reciprocating bar connected to said treadle and a pivoted catch mounted on said bar, adapted to hold said clutch in operative condition.

15. In an electric metal working apparatus, the combination with the mechanism for supplying current to the work, of a master shaft controlling the operation of said mechanism, a clutch for connecting the master shaft to its driving power and having its members normally disengaged from one another, a treadle, a reciprocating bar operated by said treadle, a pivoted catch mounted on said bar and through which said treadle operates to bring the clutch members into engagement and a trip actuated by said master shaft to free the clutch and disconnect the shaft from its driving power.

16. In an electric metal working apparatus, the combination with mechanism for supplying current to the work, of a master shaft controlling the operation of said mechanism, a clutch for coupling the master shaft to the driving power and having its members normally disengaged from one another, a rod for operating said clutch, a spring for said rod, normally holding said clutch in disengaged position, and a pivoted catch engaging said rod when moved in one direction to cause the clutch members to become engaged and adapted to be disengaged from said rod to free the same and allow the clutch members to become disengaged from one another.

17. In an electric metal working apparatus, the combination of mechanism for supplying current to the work, a master shaft controlling the operation of said mechanism, a clutch for coupling the master shaft to the driving power, a rod for operating said clutch, a spring for said rod normally holding said clutch in position in which its members will be disengaged, a catch adapted to engage said rod to operate the same against the action of said spring, and means for actuating the catch to disengage it from said rod, as and for the purpose described.

18. In an electric metal working apparatus, the combination of mechanism for supplying current to the work, a master shaft controlling the operation of said mechanism, a clutch for coupling the master shaft to the driving power, a rod for operating said clutch, a spring acting on said rod and normally holding said clutch with its members disengaged, a catch for operating on said rod to cause said clutch to engage against the action of said spring and a trip device adapted to operate on said catch and disengage it from said rod, as and for the purpose described.

19. In an electric metal working apparatus, the combination of mechanism for supplying current to the work, a master shaft controlling the operation of said mechanism, a clutch for coupling the same to the driving power and having its members normally disengaged from one another, a treadle, an actuating rod for said clutch to which the treadle is connected, a shoulder on said rod, a spring operating on said rod and normally holding the members of the clutch disengaged from one another, a catch connected to said treadle and adapted to engage said shoulder, and a trip actuated by the master shaft for disengaging the catch from the shoulder.

20. In an electric metal working apparatus, the combination of mechanism for supplying current to the work, a master shaft controlling the operation of said mechanism, a clutch for coupling the master shaft to the driving power, a treadle, a catch connected therewith and adapted to operate upon the clutch when the same is to be connected to its driving power, a trip for said catch and a cam connected with the master shaft to actuate the trip to cause the master shaft to be uncoupled from the driving power.

21. In an electric metal working apparatus, the combination with the mechanism for supplying current to the work, a master shaft controlling the operation of said mechanism, a clutch for connecting the master shaft to its driving power, mechanism connected with said shaft for disconnecting the members of the clutch and a brake adapted to engage with the rim of a clutch member when the members are disengaged and thereby positively bring the master shaft to rest.

22. In an electric metal working apparatus, the combination with a movable workholder of a stop for limiting the movement thereof when the work is softened and means for freeing the work holder from the stop to allow further movement of the workholder.

23. In an electric metal working apparatus, the combination with a movable workholder, of actuating means therefor, a stop engaged by said actuating means to limit the movement of said work-holder and means for freeing said actuating means from said stop to allow further movement of said work-holder.

24. In an electric metal working apparatus, the combination with a movable workholder, of a stop to limit the movement of said work-holder, means for adjusting the position in which said work-holder will be brought to rest by said stop and means for freeing said work-holder to allow further movement.

25. In an electric metal working apparatus, the combination with a movable workholder of an actuating lever therefor, a stop, to limit the movement of said lever, adjustable means secured to said lever to engage said stop and a treadle to draw said stop out of the path of said lever as and for the purpose described.

26. In an electric metal working machine, the combination of a movable work-holder and a stop, movable into and out of position, for limiting the forward movement of said work-holder upon softening of the work as and for the purpose described.

27. In an electric metal working machine, the combination with a movable work-holder and actuating means therefor, of a stop movable into and out of the path of said actuating means, an adjustable pin carried by said actuating means to normally engage said stop and limit the forward movement of the work-holder and a treadle operating upon said stop to draw the same out of the path of said pin to allow further forward movement of the work-holder as and for the purpose described.

28. In an electric metal working apparatus, the combination of a contact-carrier movable laterally with respect to the work, a contact-jaw mounted thereon, and a spring for forcing the contact-jaw into engagement with the work when brought into position over the work by the contact carrier.

29. In an electric metal working apparatus, the combination of a contact carrier movable laterally with respect to the work, a contact-jaw mounted thereon, a spring for forcing the contact-jaw into engagement with the work when brought into position over the work by the contact-carrier and a cam for disengaging the contact-jaw from the work.

30. In an electric metal working apparatus, a contact-carrier and a spring actuated contact-jaw said spring operating to force the jaw into contact with the work when brought into position over the same by the carrier.

31. In an electric metal working apparatus, the combination of a contact carrier, movable laterally with respect to the work, a pair of contact jaws mounted thereon and movable thereby into position where they may grasp a section of the work between them and springs for moving said contact-jaws to cause them to grasp the work after they have been brought into position and a cam for alternately freeing the jaws to allow them to be actuated by the spring and for positively disengaging them from the work preparatory to the return movement of the carrier.

32. In an electric metal working apparatus, the combination of a contact carrier movable laterally with respect to the work, co-acting contact jaws mounted thereon and a spring for forcing the contact-jaws into engagement with the work when brought into position in line with the work by the carrier.

33. In an electric metal working apparatus, the combination of a contact carrier movable laterally with respect to the work, co-acting contact jaws mounted thereon and a spring for forcing the contact jaws into engagement with the work when brought into position in line with the work by the carrier, and cams for disengaging the contact-jaws from the work.

34. In an electric metal working apparatus, the combination of a contact carrier movable transversely to and from the work, and a pair of co-acting contact jaws, pivoted thereon and adapted by swinging in a line transverse to the movement of the carrier to grasp a section of the work between them.

35. In an electric metal working apparatus, a contact carrying slide forming one terminal of the source of the heating electric currents, a pair of spring actuated contact jaws carried thereby and forming together one pole of said source, and actuated by said spring to make contact with opposite sides of the section of work when brought into position to embrace the work between them and an actuating cam for the slide as and for the purpose described.

36. In an electric metal working apparatus, the combination of a pair of current supplying contact jaws adapted to embrace the work between them, mechanism for holding the jaws out of contact with the work and a spring connecting said jaws for the purpose of causing them to engage the work when freed from said mechanism.

37. In an electric metal working apparatus, the combination of a pair of spring actuated current-supplying contact jaws adapted to embrace the work between them and an actuating cam for alternately moving the contacts out of engagement with the work and freeing them to allow them to grasp the work.

38. In an electric metal working apparatus, a contact carrying slide movable laterally with respect to the work while supported in position for heating, an actuating cam and lever therefor, and a pair of co-acting contact jaws of the same polarity, both carried by said slide and suitably pivoted thereon to permit them to move toward one another and grasp the work by its sides.

39. In an electric metal working apparatus, a pair of contact-carrying slides, movable laterally with respect to the work, each provided with a pair of contact-jaws pivoted thereon and adapted to reciprocate in a transverse line to movement of the carrier.

40. In an electric metal working apparatus, the combination of a pair of contact-carriers, means for operating said contact-carriers laterally with respect to the work, a pair of contact jaws mounted upon each of said contact-carriers and means for reciprocating said contact-jaws as and for the purpose described.

41. In an electric metal working apparatus, the combination with a master-shaft of a pair of contact-carrying slides, means controlled by said master-shaft to cause said contact-carriers to move forward, a pair of contact jaws mounted upon each of said contact-carriers and means connected to said contact-jaws to cause them to engage the work when brought into line with the work by the contact-carriers.

42. In an electric metal working apparatus, the combination with a master-shaft of a pair of contact-carrying slides, a cam on said master-shaft to cause said contact-carriers to move forward, a pair of contact-jaws pivoted upon each of said contact-carriers and a spring connected to said contact-jaws to cause them to engage the work when brought into line therewith by the contact-carriers, as and for the purpose described.

43. In an electric metal working apparatus, the combination with a master-shaft of a pair of contact-carriers, means controlled by said master-shaft to cause said contact carriers to move forward, means controlled by said master-shaft to retract said contact-carriers, a pair of contact-jaws mounted upon each of said contact-carriers, means connected to said contact-jaws to cause them to engage the work and means controlled by said master-shaft to free said contact-jaws from the work.

44. In an electric metal working apparatus, the combination with a master-shaft of a pair of contact-carriers movable laterally with respect to the work, a pair of contact-jaws pivoted upon each of said contact-carriers movable transversely with respect to the movement of the contact-carriers, a cam controlled by said master-shaft to force said contact-carriers forward, a spring connected to said contact jaws to cause them to engage the work when moved to forward position by the contact-carriers, cams controlled by said master shaft to free said contact-jaws from the work and a cam controlled by said master-shaft to retract said contact-carriers as and for the purpose described.

45. In an electric metal working apparatus, the combination with a transformer secondary, of contact-carriers having a rolling connection therewith, means for reciprocating said contact-carriers, electrode contacts pivoted to said contact-carriers and means for reciprocating said contacts in a transverse direction to the movement of said carriers.

46. In an electric metal working apparatus, the combination with a master shaft of contact-carriers, a rock-shaft, means connecting said rock-shaft with said carriers and means controlled by said master-shaft to rock said rock-shaft as and for the purpose described.

47. In an electric metal working apparatus, the combination with a master-shaft of contact-carriers, contact jaws carried by said carriers, means controlled by said master-shaft to reciprocate said carriers laterally with respect to the work, means independent of said master-shaft to cause said contact-jaws to engage the work when brought into line therewith by the movement of the carriers, and means controlled by said master-shaft to cause said contact jaws to disengage the work as and for the purpose described.

48. In an electric metal working apparatus, the combination with a master-shaft, of contact-carriers, contact jaws mounted thereon, means controlled by said master-shaft to normally hold said contact jaws out of engagement with the work and means carried by said contact-jaws to cause said jaws to engage the work when freed from said disengaging means.

49. In an electric metal working apparatus, the combination with a master-shaft, of a pair of contact-carriers, a pair of contact-jaws mounted on each of said carriers, each pair of jaws adapted to engage the work at opposite sides, a pivoted lever controlled by said master-shaft and operating on the upper contact jaws of each pair of jaws to normally hold said jaws out of engagement with the work and a second pivoted lever controlled by said master-shaft and operating on the lower contact-jaws of each pair of jaws to normally hold them out of engagement with the work, as and for the purpose described.

50. In an electric metal working apparatus, the combination with a master-shaft, of a pair of contact-carriers, a pair of contact-jaws mounted on each of said carriers, each pair of jaws adapted to engage the work at opposite sides, means controlled by said master-shaft to normally hold said contact-jaws free from the work and means carried by said contact-jaws to cause said jaws to engage the work when brought into the line of the work by the carriers, as and for the purpose described.

51. In an electric metal working apparatus, the combination with a master-shaft, of contact-carriers, contact-jaw levers pivoted thereto, contact-jaws or electrodes adjustably mounted upon said levers and means controlled by said master-shaft to operate on said contact-jaw levers to normally hold said contact-jaws out of engagement with the work as and for the purpose described.

52. In an electric metal working apparatus, the combination with a master-shaft, of contact-carriers, contact-levers pivoted thereto, electrode contacts adjustably mounted upon said levers and means controlled by said master-shaft to operate on said contact-levers to normally hold said contacts out of engagement with the work, and means mounted upon said contact-levers to cause the contacts to engage the work when freed from said disengaging means, as and for the purpose described.

53. In an electric metal working apparatus, the combination of a press, contacts and a master-shaft having cams for withdrawing the contacts and bringing the press into operation in one period of its revolution and for withdrawing the contacts but leaving the press disconnected in a subsequent period of its whole revolution.

54. In an electric metal working apparatus, the combination of a press, contacts and a master-shaft having cams for withdrawing the contacts and bringing the press into operation in one period of its revolution and for withdrawing the contacts but leaving the press disconnected in a subsequent period of its whole revolution and for advancing the contacts in an intermediate period.

55. In an electric metal working apparatus, the combination of a press, contacts, a master-shaft having a cam for advancing the contacts in one period of its revolution, cams for withdrawing the contacts and bringing the press into operation in a further period of its revolution, a cam for advancing said contacts in another period of its revolution and a cam for withdrawing said contacts but leaving the press disconnected during a subsequent period of its whole revolution.

56. In an electric metal working apparatus, the combination of contacts, a press, a master-shaft having a cam for advancing the contacts in one period of its revolution, cams for withdrawing the contacts and bringing the press into operation in a further period of its revolution, a cam for advancing said contacts in another period of its revolution and a cam for withdrawing said contacts but leaving the press disconnected during a subsequent period of its whole revolution, and a cam for automatically stopping said master-shaft between each period when said cams operate.

57. In an electric metal working apparatus, the combination of a press, a clutch therefor, contact carriers, contact jaws mounted on said carriers, a master shaft, means controlled by the shaft for automatically bringing it to rest in predetermined positions, and cams carried by said shaft and controlling the action of the said clutch and the movement of the contact jaws in a position between positions where the shaft is automatically brought to rest.

58. In an electric metal working apparatus, the combination of means for holding the work in position for passing a heating electric current therethrough, a forging tool adjustable laterally to the line of work, means for adjusting it to the desired position and means for setting it in the position of lateral adjustment.

59. In an electric metal working apparatus, the combination of means for holding the work in position for passing a heating electric current therethrough, a forging tool, a supporting post therefor provided with a groove, a shoulder on said tool adapted to engage the groove in said post, a block for supporting said post, a depending lip from said post and an adjusting screw passing through said block and secured to said lip as and for the purpose described.

60. In an electric metal working apparatus, the combination of means for holding the work in position for passing a heating electric current therethrough, a forging tool, a supporting post therefor provided with a groove, a shoulder on said tool adapted to engage the groove in said post, a block for supporting said post, a depending lip from said post, an adjusting screw passing through said block and secured to said lip to adjust the position of said tool laterally with respect to the line of the work and set screws adapted to set said block in its laterally adjusted position as and for the purpose described.

61. In an electric metal working apparatus, means for holding the work in position for passing a heating electric current therethrough, a forging tool, having a groove adapted to engage the work, means for adjusting the tool to adjust said groove laterally with respect to the work and set screws for setting the tool in position of longitudinal alinement with the work as and for the purpose described.

62. In an electric metal working apparatus, the combination of means for holding the electrically heated section of work, a press adapted to operate on said work, a clutch for connecting the press to a driving power, a controlling rod for said clutch, a catch for holding said rod so that said clutch will not operate, means connected to said rod for preventing said catch holding said rod and means for restoring said catch to operative condition after repeated movements of the rod.

63. In an electric metal working apparatus, the combination of means for holding the electrically heated section of work, a press adapted to operate on said work, a clutch therefor, a controlling rod for said clutch, a catch for normally holding said rod so that said press will not operate, means connected to said rod for preventing said catch holding said rod and means for automatically restoring said catch to operative condition after the press has operated a predetermined number of times.

64. In an electric metal working apparatus, the combination of means for holding the electrically heated section of work, a press adapted to operate on said work, a clutch therefor, a controlling rod for said clutch, a catch for normally holding said rod so that said press will not operate, means controlled by said rod for rendering said catch inoperative during a predetermined number of movements of said rod.

65. In an electric metal working apparatus, the combination of means for holding the electrically heated section of work, a press adapted to operate on said work, a clutch therefor, a controlling rod for said clutch, a ratchet, a notched disk adapted to rotate with said ratchet, a catch for normally holding said controlling rod, a pin on said catch adapted to normally rest in a notch of said disk and a pawl carried by said controlling rod and actuating said ratchet in its forward movement to prevent said pin from resting in a notch of said disk until said controlling rod has made a predetermined number of forward movements.

66. In an electric metal working apparatus, the combination of means for holding the electrically heated section of work, a press adapted to operate on said work, a clutch therefor, a controlling rod for said clutch, a ratchet, an interchangeably mounted notched disk secured to said ratchet, a catch for normally holding said controlling rod, a pin on said catch adapted to normally rest in a notch of said disk and a pawl carried by said controlling rod and actuating said ratchet in its forward movement to prevent said pin from resting in a notch of said disk until said controlling rod has made a predetermined number of forward movements.

67. In an electric metal working apparatus, the combination of means for holding the electrically heated section of work, a press adapted to operate on said work, a clutch for connecting the press to a driving power, a controlling rod therefor, a catch for normally holding said rod, means for releasing said rod from said catch and means operating on said catch to prevent said catch holding said rod.

68. In an electric metal working apparatus, the combination of means for holding the electrically heated section of work, a press adapted to operate on said work, a clutch for connecting the press to a driving power, a controlling rod therefor, a catch for normally holding said rod, means for releasing said rod from said catch, means operating on said catch to prevent said catch holding said rod, and means controlled by said rod for releasing said catch to permit it to engage said rod after a predetermined number of movements of the rod.

69. In an electric metal working apparatus, the combination of means for holding the electrically heated section of work, a press adapted to operate on said work, a clutch for connecting the press to a driving power, a controlling rod for said clutch and a blow-determining device for said press controlled by said rod.

70. In an electric metal working apparatus, the combination of means for holding the electrically heated section of work, a press adapted to operate on said work, and actuating means therefor, and an interchangeably mounted blow-determining device for said press controlled by said actuating means.

71. In an electric metal working apparatus, the combination of means for holding the electrically heated section of work, a press adapted to operate on said work, a clutch for connecting the press to a driving power, a controlling rod therefor, a catch for normally holding said rod, a loosely mounted ratchet-wheel, a notched disk adapted to revolve with said ratchet-wheel, a pin on said catch adapted to normally engage a notch in said disk, a dog or trip for freeing said rod from said catch and said catch from said disk and means carried by said rod to revolve said ratchet and prevent said catch holding said rod, as and for the purpose described.

72. In an electric metal working apparatus, the combination of mechanism for holding the electrically heated section of work, a press, a clutch for connecting the press to a driving power, a controlling rod for said clutch, a catch for normally holding said rod, a master shaft, means controlled by said master shaft for freeing said rod from said catch to cause said press to operate and means controlled by said rod to prevent said catch holding said rod until said press has operated a predetermined number of times, as and for the purpose described.

73. In an electric metal working machine, the combination of means for applying end pressure to an electrically heated section of the work, a press adapted to act on said heated section after the application of the end pressure, a master shaft controlling the operation of said press, a clutch for connecting the press to the driving power, a lever, a catch through which the lever operates to cause the clutch to couple the master shaft to its driving power, and means for disengaging said catch at predetermined points in the movement of the master shaft.

74. In an electric metal working machine, the combination of means for applying end pressure to the electrically heated section of work, a press adapted to operate on the heated section after the application of the end pressure, a master shaft controlling the operations of the press, a power clutch therefor, a treadle and means connected therewith for coupling the master shaft to the power and mechanism controlled by said master shaft for freeing the clutch from the influence of the treadle.

75. In an electric metal working apparatus, the combination of means for applying end pressure to the electrically heated section of work, a press adapted to operate on said heated section after the application of the end pressure, a master shaft controlling the operations of the press, mechanism for automatically disconnecting the driving power from the master shaft and independent means for coupling and uncoupling the driving power from the master shaft independent of the position thereof.

76. In an electric metal working machine, the combination of mechanism for causing an electric current to flow through the section of work to be heated, a master shaft controlling the operations thereof, a clutch, a treadle, a catch through which the treadle operates to cause the clutch to connect the mastershaft to its driving power and means for disengaging said catch at predetermined points in the movement of the master-shaft.

77. In an electric metal working machine, the combination of mechanism for causing an electric current to flow through the section of work to be heated, a master shaft controlling the operations thereof, a power clutch therefor, a treadle for coupling the master-shaft to the power and mechanism controlled by said master-shaft for freeing the clutch from the influence of the treadle.

78. In an electric metal working apparatus, the combination of mechanism for causing an electric current to flow through the section of work to be heated, a mastershaft controlling the operations thereof, and mechanism controlled by said master shaft for automatically disconnecting the driving power thereof to bring the shaft temporarily to rest and means controllable at will for restarting the shaft from said temporary position of rest.

79. In an electric metal working machine, the combination of a work holder, mechanism for actuating the same to apply pressure to the electrically heated section of work, a forging tool and operative mechanism therefor adapted to act on the work after the application of pressure by the operation of the work-holder, a master shaft controlling the operations of said forging tool, a clutch for connecting the mastershaft to a driving power, a treadle, a catch through which the treadle operates to cause the clutch to engage the master shaft and means for disengaging said catch at predetermined points in the movement of the master shaft.

80. In an electric metal working machine, the combination of a work holder, mechanism for causing the electric current to flow through the section of work held in said work-holder to heat the same, a master shaft controlling the operation of said mechanism, means for applying pressure to the electrically heated section of work, a forging tool for operating on the heated section after the application of such pressure, and controlled in its action by said mastershaft, a power clutch for said master shaft, a treadle for coupling the master shaft to the power, and mechanism controlled by said master shaft for freeing the clutch from the influence of the treadle.

81. In an electric metal working apparatus, the combination of a work-holder having means for moving it to apply pressure to the work therein, means for supplying heating current to the work in said work-holder, a master shaft controlling the times of application of the heating current by said means, mechanism controlled by said master shaft for automatically disconnecting the driving power thereof and means controlled at the will of the operator for recoupling the shaft to the driving power and restarting it from the position at which it comes to rest on being automatically disconnected.

82. In an electric metal working machine, the combination of a movable contact for engaging and supplying current to the work, a master shaft controlling the time of movement of said contact, a clutch, a treadle, a catch through which the treadle operates to cause the clutch to couple the master shaft to its driving power, and means for disengaging said catch at predetermined points in the movement of the master shaft.

83. In an electric metal working machine, the combination of a movable contact for engaging and supplying current to the work, a master shaft controlling the operation of said contact, a power clutch therefor, a treadle for coupling the master shaft to the power and mechanism controlled by said master shaft for freeing the clutch from the influence of the treadle.

84. In an electric metal working apparatus, the combination of a contact for engaging and supplying current to the work, mechanism for moving the same into and out of engagement with the work, a master shaft controlling the times of operation of said mechanism, and mechanism controlled by said master shaft for automatically disconnecting the driving power thereof, and means controllable at will for automatically reconnecting said shaft with the driving power in the position in which it is left by the automatic disconnection.

85. In an electric metal working machine, the combination with mechanism for applying end pressure to the electrically heated section of work, a forging tool adapted to operate on the section of work after the application of said end pressure, a master shaft controlling the operations of said tool, a clutch for connecting the master shaft to its driving power, means for connecting said clutch and means for automatically disconnecting said clutch after the tool has acted.

86. In an electric metal working apparatus, the combination with mechanism for applying end pressure to the electrically heated section of work, a forging tool adapted to operate on said heated section after the application of said end pressure, a master shaft controlling the operations of said tool, a clutch for connecting the master shaft to its driving power, a treadle, a catch through which the treadle operates to cause the clutch to couple the master shaft to its driving power and a trip for said catch, as and for the purpose described.

87. In an electric metal working apparatus, the combination with mechanism for applying end pressure to the electrically heated section of work, a forging tool adapted to operate on said heated section of work after the application of said end pressure, a master shaft controlling the operations of said tool, a clutch for connecting the master shaft to its driving power, a treadle, a catch through which the treadle operates to cause the clutch to couple the master shaft to its driving power and a trip for said catch controlled by said master shaft as and for the purpose described.

88. In an electric metal working apparatus, the combination with mechanism for applying end pressure to the electrically heated section of work, a forging tool adapted to operate on the section of work after the application of heating current and end pressure thereto, a master shaft controlling the operations of said tool, a clutch for connecting the master shaft to its driving power, a treadle, a catch through which the treadle operates to cause the clutch to couple the master shaft to its driving power and a trip normally free from said catch and adapted to engage said catch by the action of said master shaft as and for the purpose described.

89. In an electric metal working apparatus, the combination with mechanism for applying end pressure to the electrically heated section of work, a forging tool adapted to operate on said heated section after the application of the end pressure, a master shaft controlling the operations of said tool, a clutch for connecting the master shaft to its driving power and having its members normally disengaged from one another, a treadle, a reciprocating bar connected to said treadle and a pivoted catch mounted on said bar through which the treadle operates to cause the clutch members to become engaged as and for the purpose described.

90. In an electric metal working apparatus, the combination with mechanism for applying end pressure to the electrically heated section of work, of a forging tool adapted to operate on the work after the application of the end pressure, a master shaft controlling the operations of said tool, a clutch for connecting the master shaft to its driving power and having its members normally disengaged, a treadle for causing said clutch members to engage, a reciprocating bar connected to said treadle and a pivoted catch mounted on said bar adapted to hold said clutch in its engaged position.

91. In an electric metal working apparatus, the combination with mechanism for applying end pressure to the work, of a forging tool adapted to operate on the work after the application of the end pressure, a master shaft controlling the operations of said tool, a clutch for connecting said shaft to its driving power and having its members normally disengaged, a treadle, a reciprocating bar operated by said treadle, a pivoted catch mounted on said bar through which the treadle operates to cause the clutch members to become engaged and a trip actuated by said master shaft to free the clutch from the master shaft.

92. In an electric metal working apparatus, the combination with mechanism for applying end pressure to the electrically heated section of work, a forging tool adapted to operate on the section when heated, a master shaft controlling the operations of said tool, a clutch for connecting the shaft to its driving power and having its members normally disengaged, a rod for operating said clutch, a spring for said rod normally holding said clutch out of action and a catch operating on said rod to couple the master shaft to its driving power as and for the purpose described.

93. In an electric metal working apparatus, the combination with mechanism for applying end pressure to the electrically heated section of work, a forging tool adapted to act on the work after the application of the pressure, a master shaft controlling the operations of said tool, a clutch for connecting the master shaft to its driving power and having its members normally disengaged, a rod for operating said clutch, a spring for said rod normally holding said clutch out of action, a catch operating on said rod against the action of the spring and means for freeing the rod from the catch.

94. In an electric metal working apparatus, the combination with mechanism for applying end pressure to the electrically heated section of work, of a forging tool adapted to operate on the work after the application of end pressure, a master shaft controlling the operations of said tool, a clutch for connecting the master shaft to its driving power, a treadle, an actuating rod for said clutch, a shoulder on said rod, a spring operating on said rod and normally holding said clutch in the disengaged condition, a catch connected to said treadle and adapted to engage said shoulder, and a trip for said catch actuated by the master shaft.

95. In an electric metal working apparatus, the combination of mechanism for applying end pressure to the electrically heated section of work, a forging tool adapted to operate on the work after the application of said pressure, a master shaft controlling the operations of said tool, a clutch for connecting the master shaft to its driving power, a treadle, a catch through which the treadle operates to cause the clutch to couple the master shaft to its driving power, a trip for said catch, and a cam on the master shaft for actuating said trip to disengage the clutch.

96. In an electric metal working machine, the combination of mechanism governing the flow of heating electric current through the work, a master shaft controlling the times of operation of said mechanism, a press, a clutch normally disconnected as to its members, means for connecting said clutch members, press-controlling means controlled by said master shaft and means for automatically disconnecting said clutch after the press-controlling means have acted.

97. In an electric metal working apparatus, the combination with mechanism governing the flow of heating current through the work, a master shaft controlling the times of operation of said mechanism, a clutch for connecting the master shaft to its driving power, a treadle, a catch through which the treadle operates the clutch and a trip for said catch as and for the purpose described.

98. In an electric metal working apparatus, the combination with mechanism governing the flow of heating electric current through the work, a master shaft controlling the times of operation of said mechanism, a clutch for connecting the master shaft to its driving power, a treadle, a catch through which the treadle operates to cause the clutch to couple the master shaft to its driving power and a trip for said catch controlled by said master shaft, as and for the purpose described.

99. In an electric metal working apparatus, the combination with mechanism governing the flow of heating electric current through the work, of a master shaft controlling the times of operation of said mechanism, a clutch, a treadle, a catch through which the treadle acts to cause the clutch to couple the master shaft to its driving power and a trip normally free from said catch and adapted to engage the same by the action of the master shaft as and for the purpose described.

100. In an electric metal working apparatus, the combination of mechanism governing the flow of heating electric current through the work, a master shaft controlling the times of operation of said mechanism, a clutch normally disengaged, a lever operable at will, a reciprocating bar connected to said lever and a pivoted catch mounted on said bar and adapted to hold said clutch in engaged position and means upon the master-shaft for releasing said catch to stop the shaft and return the same to the control of said lever.

101. In an electric metal working apparatus, the combination of mechanism governing the flow of heating electric current through the work, a master shaft controlling the operation of said mechanism, a clutch normally disengaged, a treadle, a reciprocating bar operated by said treadle, a pivoted catch mounted on said bar and through which said treadle operates to cause the clutch to couple the master shaft to its driving power and a trip actuated by said master shaft to free the master shaft from its driving power.

102. In an electric metal working apparatus, the combination of mechanism governing the flow of heating electric current through the work, a master shaft controlling the times of operation of said mechanism, a clutch, a treadle, a catch through which the treadle operates to cause the clutch to couple the master shaft to its driving power, a trip for said catch and a cam on the master shaft actuating said trip to disengage the members of the clutch from one another.

103. In an electric metal working apparatus, the combination of a work-holder, mechanism for actuating the same to apply pressure to the electrically heated section of work, a press adapted to engage the heated section after the application of the pressure by the operation of the work-holder and while the work is held by said holder, a master shaft, a clutch normally disconnected for coupling the master shaft to its driving power, means for connecting said clutch, press-controlling means controlled by said master shaft and means for automatically disconnecting said clutch after the press-controlling means have acted.

104. In an electric metal working apparatus, the combination of a work-holder, mechanism for actuating the same to apply pressure to the electrically heated section of .work, mechanism governing the flow of heating electric current through the work, a master shaft controlling the times of operation of said mechanism, a clutch, a treadle, a catch through which the treadle operates to cause the clutch to couple the master shaft to its driving power and a trip for said catch as and for the purpose described.

105. In an electric metal working apparatus, the combination of a work-holder, mechanism for actuating the same to apply pressure to the electrically heated section of work, a mechanism governing the flow of heating electric current through the work, a master shaft controlling the time of operation of said mechanism, a clutch, a treadle, a catch through which the treadle operates to cause the clutch to couple the master shaft to its driving power and a trip for said catch controlled by said master-shaft as and for the purpose described.

106. In an electric metal working apparatus, the combination of a work-holder, mechanism for actuating the same to apply pressure to the electrically heated section of work, a mechanism governing the flow of heating electric current through the work, a master shaft controlling the time of operation of said mechanism, a clutch for connecting the master shaft to the driving power, a treadle, a catch though which the treadle operates on the clutch and a trip normally free from said catch and adapted to engage said catch by the action of said master-shaft as and for the purpose described.

107. In an electric metal working apparatus, the combination of a work-holder, mechanism for actuating the same to apply pressure to the electrically heated section of work, a mechanism governing the flow of heating electric current through the work, a master shaft controlling the time of operation of said mechanism, a clutch normally disengaged, a treadle, a reciprocating bar connected to said treadle and a pivoted catch mounted on said bar through which the treadle operates to cause the clutch to couple the master shaft to its driving power, as and for the purpose described.

108. In an electric metal working apparatus, the combination of a work-holder, mechanism for actuating the same to apply pressure to the electrically heated section of work, a mechanism governing the flow of heating electric current through the work, a master shaft controlling the time of operation of said mechanism, a clutch normally disengaged for connecting the master shaft to the driving power, a treadle for controlling said clutch, a reciprocating bar connected to said treadle and a pivoted catch mounted on said bar adapted to hold said clutch in its engaged position.

109. In an electric metal working apparatus, the combination of a work-holder, mechanism for actuating the same to apply pressure to the electrically heated section of work, a mechanism governing the flow of heating electric current through the work, a master shaft controlling the time of operation of said mechanism, a clutch normally disengaged for connecting said master shaft to its driving power as to its members, a rod for operating said clutch, a spring for said rod normally holding said clutch in disengaged position and a catch operating on said rod to cause said clutch to engage as and for the purpose described.

110. In an electric metal working apparatus, the combination of a work-holder, mechanism for actuating the same to apply pressure to the electrically heated section of work, a mechanism governing the flow of heating electric current through the work, a master shaft controlling the time of operation of said mechanism, a clutch normally disengaged for connecting the master shaft to its driving power as to its members, a rod for operating said clutch, a spring for said road normally holding said clutch in disengaged position, a catch operating on said rod to cause said clutch to engage against the action of said spring and means for freeing said rod from said catch.

111. In an electric metal working apparatus, the combination of a work-holder, mechanism for actuating the same to apply pressure to the electrically heated section of work, a mechanism governing the flow of heating electric current through the work, a master shaft controlling the time of operation of said mechanism, a clutch normally disengaged for connecting the master shaft to its driving power as to its members, a rod for operating said clutch, a spring for said rod normally holding said clutch in disengaged position, a catch operating on said rod to cause said clutch to engage against the action of said spring and means for freeing said rod from said catch.

112. In an electric metal working apparatus, the combination of a work-holder, mechanism for actuating the same to apply pressure to the electrically heated section of work, a mechanism governing the flow of heating electric current through the work, a master shaft controlling the time of operation of said mechanism, a clutch normally disengaged for connecting the master shaft to its driving power as to its members, a rod for operating said clutch, a spring for said rod normally holding said clutch in disengaged position, a catch for operating on said rod to cause said clutch to engage against the action of said spring and a trip for freeing said rod from said catch.

113. In an electric metal working apparatus, the combination of a work-holder, mechanism for actuating the same to apply pressure to the electrically heated section of work, a mechanism governing the flow of heating electric current through the work, a master shaft controlling the time of operation of said mechanism, a clutch therefor normally disengaged, a treadle, an actuating rod for said clutch, a shoulder on said rod, a spring operating on said rod normally holding said clutch in the disengaged position, a catch connected to said treadle adapted to engage said shoulder to cause the clutch to engage against the action of said spring and a trip for said catch actuated by said master-shaft to cause the clutch to be disengaged.

114. In an electric metal working apparatus, the combination of a work-holder, mechanism for actuating the same to apply pressure to the electrically heated section of work, a mechanism governing the flow of heating electric current through the work, a master shaft controlling the time of operation of said mechanism, a clutch, a treadle, a catch through which the treadle operates to cause the clutch to couple the master shaft to its driving power, a trip for said catch, and a cam on the master-shaft to actuate said trip to disengage said clutch.

115. In an electric metal working apparatus, the combination of a work-holder, mechanism for actuating the same to apply pressure to the electrically heated section of work, a mechanism governing the flow of heating electric current through the work, a master shaft controlling the time of operation of said mechanism, a clutch normally disengaged, a treadle, a reciprocating bar operated by said treadle, a pivoted catch mounted on said bar through which said treadle operates to cause the clutch to couple the master shaft to its driving power and a trip actuated by said master shaft to free the clutch from the master-shaft.

116. In an electric metal working apparatus, the combination of a contact for engaging and supplying current to the work, a master shaft controlling the time of operation of said contact, a press adapted to operate on the heating of the work by the current, a clutch for connecting the master shaft to its driving power, press-controlling means controlled by said master shaft and means connected to said master shaft for automatically disconnecting the clutch after the press-controlling means have acted.

117. In an electric metal working apparatus, the combination of a contact for engaging and supplying current to the work, a master shaft controlling the time of operation of said contact, a clutch for coupling the master shaft to its driving power, a treadle, a catch through which the treadle operates to cause the clutch to couple the mastershaft to its driving power and a trip for said catch, as and for the purpose described.

118. In an electric metal working apparatus, the combination of a contact for engaging and supplying current to the work, a master shaft controlling the time of operation of said contact, a clutch for coupling the master shaft to its driving power, a treadle, a catch through which the treadle operates to cause the clutch to couple the mastershaft to its driving power and a trip for said catch controlled by said mastershaft as and for the purpose described.

119. In an electric metal working apparatus, the combination of a contact for engaging and supplying current to the work, a master shaft controlling the time of operation of said contact, a clutch for coupling the master shaft to its driving power, a treadle, a catch through which the treadle operates to cause the clutch to couple the mastershaft to its driving power and a trip normally free from said catch and adapted to engage said catch by the action of said master-shaft as and for the purpose described.

120. In an electric metal working apparatus the combination of a contact for engaging and supplying current to the work, a master shaft controlling the time of operation of said contact, a clutch for coupling the master shaft to its driving power normally disengaged as to its members, a treadle, a reciprocating bar connected to said treadle and a pivoted catch mounted on said bar through which the treadle operates to cause the clutch to engage the mastershaft, as and for the purpose described.

121. In an electric metal working apparatus, the combination of a contact for engaging and supplying current to the work, a master shaft controlling the time of operation of said contact, a clutch for coupling the master shaft to its driving power normally disengaged as to its members, a treadle for coupling said clutch to the mastershaft, a reciprocating bar connected to said treadle and a pivoted catch mounted on said bar adapted to hold said clutch in its engaged position.

122. In an electric metal working apparatus, the combination of a contact for engaging and supplying current to the work, a master shaft controlling the time of operation of said contact, a clutch for coupling the master shaft to its driving power normally disengaged as to its members, a treadle, a reciprocating bar operating by said treadle, a pivoted catch mounted on said bar through which said treadle operates to cause the clutch to engage the master-shaft and a trip actuated by said master-shaft to free the clutch from the master-shaft.

123. In an electric metal working apparatus, the combination of a contact for engaging and supplying current to the work, a master shaft controlling the time of operation of said contact, a clutch for coupling the master shaft to its driving power normally disengaged as to its members, a rod for operating said clutch, a spring for said rod normally holding said clutch in disengaged position and a catch operable at will and operating on said rod to cause said clutch to engage as and for the purpose described.

124. In an electric metal working apparatus, the combination of a contact for engaging and supplying current to the work, a master shaft controlling the time of operation of said contact, a clutch for coupling the master shaft to its driving power normally disengaged as to its members, a rod for operating said clutch, a spring for said rod normally holding said clutch in disengaged position, a catch operating on said rod to cause said clutch to engage against the action of said spring and means for freeing said rod from said catch.

125. In an electric metal working apparatus, the combination of a contact for engaging and supplying current to the work, a master shaft controlling the time of operation of said contact, a clutch for coupling the master shaft to its driving power normally disengaged as to its members, a rod for operating said clutch, a spring for said rod normally holding said clutch in disengaged position, a catch operating on said rod to cause said clutch to engage against the action of said spring and means for freeing said rod from said catch.

126. In an electric metal working apparatus, the combination of a contact for engaging and supplying current to the work, a master shaft controlling the time of operation of said contact, a clutch for coupling the master shaft to its driving power normally disengaged as to its members, a rod for operating said clutch, a spring for said rod normally holding said clutch in disengaged position, a catch for operating on said rod to cause said clutch to engage against the action of said spring and a trip for freeing said rod from said catch.

127. In an electric metal working apparatus, the combination of a contact for engaging and supplying current to the work, a master shaft controlling the time of operation of said contact, a clutch for coupling the master shaft to its driving power normally disengaged as to its members, a treadle, an actuating rod for said clutch, a shoulder on said rod, a spring operating on said rod normally holding said clutch in the disengaged position, a catch connected to said treadle, adapted to engage said shoulder to cause the clutch to engage against the action of said spring and a trip for said catch actuated by said master-shaft to cause the clutch to be disengaged.

128. In an electric metal working apparatus, the combination of a contact for engaging and supplying current to the work, a master shaft controlling the time of operation of said contact, a clutch for coupling the master shaft to its driving power, a treadle, a catch through which the treadle operates to cause the clutch to couple the mastershaft to its driving power, a trip for said catch, and a cam on the master-shaft to actuate said trip to disengage said clutch.

129. In an electric metal working apparatus, the combination of mechanism for causing an electric current to flow through the section of work to be heated, a press, a clutch therefor, a controlling rod for said clutch, a catch for holding said rod so that said clutch will not operate and means for releasing said catch after a predetermined number of movements of said rod.

130. In an electric metal working apparatus, the combination of mechanism for causing an electric current to flow through the section of work to be heated, a press, a clutch therefor, a controlling rod for said clutch, a catch for normally holding said rod so that said press will not operate, a notched disk for preventing said catch holding said rod and means connected with said rod for operating said disk.

131. In an electric metal working apparatus, the combination of mechanism for causing an electric current to flow through the section of work to be heated, a press, a clutch therefor, a controlling rod for said clutch, a catch for normally holding said rod so that said press will not operate, means controlled by said rod for rendering said catch inoperative at its first movement and restoring it to operative condition by a repetition of movements of said rod.

132. In an electric metal working apparatus, the combination of mechanism for causing an electric current to flow through the section of work to be heated, a press, a clutch therefor, a controlling rod for said clutch, a ratchet, a notched disk adapted to rotate with said ratchet, a catch for normally holding said controlling rod, a pin on said catch adapted to normally rest in a notch of said disk and a pawl carried by said controlling rod and actuating said ratchet to prevent said pin from resting in a notch of said disk until said controlling rod has made a predetermined number of movements.

133. In an electric metal working apparatus, the combination of mechanism for causing an electric current to flow through the section of work to be heated, a press, a clutch therefor, a controlling rod for said clutch, a ratchet, an interchangeably mounted notched disk secured to said ratchet, a catch for normally holding said controlling rod, a pin on said catch adapted to normally rest in a notch of said disk and a pawl carried by said controlling rod and actuating said ratchet to prevent said pin from resting in a notch of said disk until said controlling rod has made a predetermined number of movements.

134. In an electric metal working apparatus, the combination of mechanism for causing an electric current to flow through the section of work to be heated, a press, a clutch for the latter, a controlling rod therefor, a catch for normally holding said rod, means for releasing said rod from said catch and means upon said catch to prevent said catch holding said rod.

135. In an electric metal working apparatus, the combination of mechanism for causing an electric current to flow through the section of work to be heated, a press, a clutch therefor, a controlling rod for said clutch and a blow-determining device for said press controlled by said rod.

136. In an electric metal working apparatus, the combination of mechanism for causing an electric current to flow through the section of work to be heated, a press, and actuating means therefor, and an interchangeably mounted blow-determining device for said press controlled by said actuating means.

137. In an electric metal working apparatus, the combination of mechanism for causing an electric current to flow through the section of work to be heated, a press a clutch for the latter, a controlling rod therefor, a catch for normally holding said rod, a loosely mounted ratchet wheel, a notched disk adapted to revolve with said ratchet-wheel, a pin on said catch adapted to normally engage a notch in said disk, a dog or trip for freeing said rod from said catch and means carried by said rod to revolve said ratchet and prevent said catch holding said rod until said rod has made a predetermined number of movements, as and for the purpose described.

138. In an electric metal working apparatus, the combination of mechanism for causing an electric current to flow through the section of work to be heated, a press, a clutch therefor, a controlling rod for said clutch, a catch for normally holding said rod a mastershaft means controlled by said master-shaft for freeing said rod from said catch to cause said press to operate and means controlled by said rod to prevent said catch holding said rod until said press has operated a predetermined number of times, as and for the purpose described.

139. In an electric metal working apparatus, the combination of a work-holder, mechanism for operating the same to apply pressure to the electrically heated section of work, a press, a clutch therefor, a controlling rod for said clutch, a catch for normally holding said rod so that said press will not operate, and means rendering the catch inoperative and for releasing said catch after the press has been operated a predetermined number of times.

140. In an electrical metal working apparatus, the combination of a work-holder, mechanism for operating the same to apply pressure to the electrically heated section of work, a press, a clutch therefor, a controlling rod for said clutch, a catch for normally holding said rod so that said press will not operate, and means controlled by said rod for rendering said catch inoperative at its first movement and restoring it to operative condition after a predetermined number of movements of said rod.

141. In an electric metal working apparatus, the combination of a work-holder, mechanism for operating the same to apply pressure to the electrically heated section of work, a press, a clutch therefor, a controlling rod for said clutch, a ratchet, a notched disk adapted to rotate with said ratchet, a catch for normally holding said controlling rod, a pin on said catch adapted to normally rest in a notch of said disk and a pawl carried by said controlling rod and actuating said ratchet in its forward movement to prevent said pin from resting in a notch of said disk until said controlling rod has made a predetermined number of movements.

142. In an electric metal working apparatus, the combination of a work-holder, mechanism for operating the same to apply pressure to the electrically heated section of work, a press, a clutch therefor, a controlling rod for said clutch, a ratchet, an interchangeably mounted notched disk secured to said ratchet, a catch for normally holding said controlling rod, a pin on said catch adapted to normally rest in a notch of said disk and a pawl carried by said controlling rod and actuating said ratchet in its forward movement to prevent said pin from resting in a notch of said disk until said controlling rod has made a predetermined number of movements.

143. In an electric metal working apparatus, the combination of a work-holder, mechanism for operating the same to apply pressure to the electrically heated section of work, a press, a clutch for the latter, a controlling rod therefor, a catch for normally holding said rod, means for releasing said rod from said catch and means upon said catch to prevent said catch holding said rod.

144. In an electric metal working apparatus, the combination of a work-holder, mechanism for operating the same to apply pressure to the electrically heated section of work, a press, a clutch for the latter, a controlling rod therefor, a catch for normally holding said rod, means for releasing said rod from said catch, and means controlled by said rod to cause said catch to engage said rod after repeated movements of the rod.

145. In an electric metal working apparatus, the combination of a work-holder, mechanism for operating the same to apply pressure to the electrically heated section, a press, a clutch therefor, a controlling rod for said clutch and a blow-determining device for said press-controlled by said rod.

146. In an electric metal working apparatus, the combination of a work-holder mechanism for operating the same to apply pressure to the electrically heated section of work, a press and actuating means therefor, and an interchangeably mounted blow-determining device for said press controlled by said actuating means.

147. In an electric metal working apparatus, the combination of a work-holder, mechanism for operating the same to apply pressure to the electrically heated section of work, a press, a clutch for the latter, a controlling rod therefor, a catch for normally holding said rod, a loosely mounted ratchet-wheel, a notched disk adapted to revolve with said ratchet-wheel, a pin on said catch adapted to normally engage a notch in said disk, a dog or trip for freeing said rod from said catch and means carried by said rod to revolve said ratchet and prevent said catch holding said rod until said rod has made a predetermined number of movements, as and for the purpose described.

148. In an electric metal working apparatus, the combination of a work-holder, mechanism for operating the same to apply pressure to the electrically heated section of work, a press, a clutch therefor, a controlling rod for said clutch, a catch for normally holding said rod, a mastershaft means controlled by said master-shaft for freeing said rod from said catch to cause said press to operate and means controlled by said rod to prevent said catch holding said rod until said press has operated a predetermined number of times, as and for the purpose described.

149. In an electric metal working apparatus, the combination with mechanism for applying end pressure to the electrically heated section of work, of a press, a clutch therefor, a controlling rod for said clutch, a catch for holding said rod so that said clutch will not operate, means for releasing the catch and independent means operated by said rod for holding said catch in releasing position.

150. In an electric metal working apparatus, the combination with mechanism for applying end pressure to the electrically heated section of work, of a press, a clutch therefor, a controlling rod for said clutch, a catch for normally holding said rod so that said press will not operate, means for releasing the catch and independent means connected to said rod for preventing said catch again holding said rod until the press is operated a predetermined number of times.

151. In an electric metal working apparatus, the combination with mechanism for applying end pressure to the electrically heated section of work, of a press, a clutch therefor, a controlling rod for said clutch, a catch for normally holding said rod so that said press will not operate, and means controlled by said rod for first rendering said catch inoperative and then causing said catch to hold said rod after a predetermined number of movements of said rod.

152. In an electric metal working apparatus, the combination with mechanism for applying end pressure to the electrically heated section of work, of a press, a clutch therefor, a controlling rod for said clutch, a ratchet, a notched disk adapted to rotate with said ratchet, a catch for normally holding said controlling rod, a pin on said catch adapted to normally rest in a notch of said disk and a pawl carried by said controlling rod and actuating said ratchet in its forward movement to prevent said pin from resting in a notch of said disk until said controlling rod has made a predetermined number of movements.

153. In an electric metal working apparatus, the combination with mechanism for applying end pressure to the electrically heated section of work, of a press, a clutch for the latter, a controlling rod therefor, a catch for normally holding said rod, means for releasing said rod from said catch and means upon said catch to prevent said catch holding said rod.

154. In an electric metal working apparatus, the combination with mechanism for applying end pressure to the electrically heated section of work, of a press, a clutch for the latter, a controlling rod therefor, a catch for normally holding said rod, means for releasing said rod from said catch, means operated by the rod on its first movement to cause the operation of the clutch and for preventing said catch holding said rod and adapted to hold the catch out of action until the rod has made a plurality of such movements.

155. In an electric metal working apparatus, the combination with mechanism for applying end pressure to the electrically heated section of work, of a press, a clutch therefor, a controlling rod for said clutch and a blow-determined device for said press controlled by said rod.

156. In an electric metal working apparatus, the combination with mechanism for applying end pressure to the electrically heated section of work, of a press and actuating means therefor, and an interchangeably mounted blow-determining device for said press controlled by said actuating means.

157. In an electric metal working apparatus, the combination with mechanism for applying end pressure to the electrically heated section of work, of a press, a clutch for the latter, a controlling rod therefor, a catch for normally holding said rod, a loosely mounted ratchet-wheel, a notched disk adapted to revolve with said ratchet-wheel, a pin on said catch adapted to normally engage a notch in said disk, a dog or trip for freeing said rod from said catch, and means carried by said rod to revolve said ratchet and prevent said catch holding said rod until said rod has made a predetermined number of movements, as and for the purpose described.

158. In an electric metal working apparatus, the combination with mechanism for applying end pressure to the electrically heated section of work, of a press, a clutch therefor, a controlling rod for said clutch, a catch for normally holding said rod, a mastershaft and means controlled by said master-shaft for freeing said rod from said catch to cause said press to operate and means controlled by said rod to prevent said catch holding said rod until said press has operated a predetermined number of times, as and for the purpose described.

159. In an electric metal working apparatus, the combination of a contact for engaging and passing electric current into the work, mechanism for moving the same into and out of engagement, a clutch, a controlling rod for said clutch, a press operated through said clutch, a catch for holding said rod so that said clutch will not operate, and means connected to said rod for preventing said catch holding said rod until said rod has made a predetermined number of movements.

160. In an electric metal working apparatus, the combination of a contact for engaging and passing electric current into the work, mechanism for moving the same into and out of engagement, a press, a clutch therefor, a controlling rod for said clutch, a catch for normally holding said rod so that said press will not operate, and means connected to said rod for preventing said catch holding said rod until after the press has operated a predetermined number of times.

161. In an electric metal working apparatus, the combination of a contact for engaging and passing electric current into the work, mechanism for moving the same into and out of engagement, a press, a clutch therefor, a controlling rod for said clutch, a ratchet, a notched disk adapted to rotate with said ratchet, a catch for normally holding said controlling rod, a pin on said catch adapted to normally rest in a notch of said disk and a pawl carried by said controlling rod and actuating said ratchet in its forward movement to prevent said pin from resting in a notch of said disk until said controlling rod has made a predetermined number of movements.

162. In an electric metal working apparatus, the combination of a contact for engaging and passing electric current into the work, mechanism for moving the same into and out of engagement, a press, a clutch therefor, a controlling rod for said clutch, a catch for normally holding said rod so that said press will not operate, and means controlled by said rod for rendering said catch inoperative until said rod has made a predetermined number of movements.

163. In an electric metal working apparatus, the combination of a contact for engaging and passing electric current into the work, mechanism for moving the same into and out of engagement, a press, a clutch therefor, a controlling rod for said clutch, a ratchet, an interchangeably mounted notched disk secured to said ratchet, a catch for normally holding said controlling rod, a pin on said catch adapted to normally rest in a notch of said disk and a pawl carried by said controlling rod and actuating said ratchet in its forward movement to prevent said pin from resting in a notch of said disk until said controlling rod has made a predetermined number of movements.

164. In an electric metal working apparatus, the combination of a contact for engaging and passing electric current into the work, mechanism for moving the same into and out of engagement, a press, a clutch for the latter, a controlling rod therefor, a catch for normally holding said rod, means for releasing said rod from said catch and means upon said catch to prevent said catch holding said rod.

165. In an electric metal working apparatus, the combination of a contact for engaging and passing electric current into the work, mechanism for moving the same into and out of engagement, a press, a clutch for the latter, a controlling rod therefor, a catch for normally holding said rod, means for releasing said rod from said catch, and means controlled by said rod for holding said catch in releasing position until the rod has made a predetermined number of movements.

166. In an electric metal working apparatus, the combination of a contact for engaging and passing electric current into the work, mechanism for moving the same into and out of engagement, a press, a clutch therefor, a controlling rod for said clutch and a blow determining device for said press controlled by said rod.

167. In an electric metal working apparatus, the combination of a contact for engaging and passing electric current into the work, mechanism for moving the same into and out of engagement, a press, and actuating means therefor, and an interchangeably mounted blow-determining device for said press controlled by said actuating means.

168. In an electric metal working apparatus, the combination of a contact for engaging and passing electric current into the work, mechanism for moving the same into and out of engagement, a press, a clutch, a controlling rod therefor, a catch for normally holding said rod, a loosely mounted ratchet-wheel, a notched disk adapted to revolve with said ratchet wheel, a pin on said catch adapted to normally engage a notch in said disk, a dog or trip for freeing said rod from said catch and said disk and means carried by said rod to revolve said ratchet and prevent said catch holding said rod until said rod has made a predetermined number of movements, as and for the purpose described.

169. In an electric metal working apparatus, the combination of a contact for engaging and passing electric current into the work, mechanism for moving the same into and out of engagement, a master-shaft, a press, a clutch therefor, a controlling rod for said clutch, a catch for normally holding said rod, means controlled by said master-shaft for freeing said rod from said catch to cause said press to operate and means controlled by said rod to prevent said catch holding said rod until said press has operated a predetermined number of times, as and for the purpose described.

170. In an electric metal working apparatus, the combination with mechanism for applying end pressure to the electrically heated section of work, of a press, a clutch therefor, a controlling rod for said clutch, a ratchet, an interchangeably mounted notched disk secured to said ratchet, a catch for normally holding said controlling rod, a pin on said catch adapted to normally rest in a notch of said disk and a pawl carried by said controlling rod and actuating said ratchet in its forward movement to prevent said pin from resting in a notch of said disk until said controlling rod has made a predetermined number of movements.

171. In an electric metal working apparatus, the combination of mechanism for causing an electric current to flow through the section of work to be heated, a press, a clutch for the latter, a controlling rod therefor, a catch for normally holding said rod, means for releasing said rod from said catch, and means controlled by said rod for holding said catch in releasing position until the rod has made a predetermined number of movements.

172. In an electric metal working apparatus, the combination of contacts for supplying heating current to the work, a master shaft and mechanism operated thereby for bringing said contacts into and out of engagement with the work, a clutch for connecting the said shaft with the power, means for automatically disconnecting said clutch in position of the master shaft where the contacts will engage the work, means controlled by the yielding of the metal for cutting off the flow of the heating current while the contacts are engaged, and means operable at the will of the attendant for again connecting the clutch to cause the withdrawal of the contacts.

173. In an electric metal working apparatus, the combination of contacts for supplying heating current to the work, a master shaft and mechanism operated thereby for bringing said contacts into and out of engagement, means controlled by the yielding of the work for cutting off the flow of current through the contacts, independent means for causing the contacts to be withdrawn, a press, a clutch therefor, and means controlled by the master shaft for bringing said clutch into action automatically when the contacts are withdrawn.

174. In an electric metal working apparatus, the combination of contacts for feeding current into the work, a master shaft, means controlled thereby for bringing the contacts into engagement with the work, means for automatically stopping said shaft while the contacts are engaged, means controlled by the yielding of the heated metal for cutting off the flow of current through it, and means controlled at will by the operator for re-starting the master shaft to cause the withdrawal of said contacts.

175. In an electric metal working apparatus, the combination of a press, a master shaft, a power clutch for said master shaft normally disengaged from the power, controlling mechanism adapted to be used at will by the operator for coupling the master shaft to the power, current supplying contacts adapted to engage the work, means controlled by said master shaft for causing said contacts to be disengaged from the work, press controlling means controlled by said master shaft and mechanism controlled by said master shaft for freeing the clutch from the influence of said controlling mechanism after the press controlling means have acted.

176. In an electric metal working apparatus, the combination of current supplying contacts, a master shaft provided with means for operating said contacts to cause them to engage the work, a clutch, means for automatically disengaging the members of the clutch when the master shaft has rotated sufficiently to bring the contacts into engagement with the work, means for automatically breaking a supply circuit of the machine when the work softens and means controllable at the will of the operator for causing the members of the clutch to reëngage, thereby re-starting the master shaft and withdrawing the contacts from engagement with the work.

177. In an electric metal working apparatus, the combination of a master shaft, a power clutch therefor a clutch controlling mechanism for coupling the master shaft to the power, a current supplying contact adapted to engage the work, means controlled by said master shaft for causing said contact to be withdrawn from engagement with the work and mechanism controlled by said master shaft for freeing the clutch from the influence of the clutch controlling mechanism after the contact has been removed from engagement with the work.

178. In an electric metal working apparatus, the combination of a contact for feeding current to the work, a master shaft controlling the operation of said contact, a clutch for connecting the master shaft to its driving power, means for automatically stopping the master shaft when the contact engages the work, and means controllable at will by the operator for restarting the master shaft to disengage the contact.

179. In an electric metal working apparatus, the combination of a current supplying contact adapted to engage the work, a master shaft, a clutch for connecting the master shaft to its driving power, means for starting the master shaft to bring the contact into engagement with the work, means for automatically disengaging the clutch members when the contact has been brought into engagement with the work, manual devices for completing the circuit and for applying pressure to the work and means controllable at will for re-starting the master shaft.

180. In an electric metal working machine provided with a mastershaft automatically controlling a cycle of operations in said machine, the combination of means for automatically stopping the mastershaft at an intermediate stage of the cycle to permit the operator to control the heating at will and means controlled at will by the operator for restarting the machine to permit it to complete its cycle.

181. In an electric metal working machine, the combination of a mastershaft and mechanisms controlled thereby and operating in a cycle under the control of said shaft, means for automatically stopping the machine at an intermediate stage of its cycle of actions, in which stage heating takes place and means controllable at will by the operator for restarting the machine to complete the cycle, whereby the period of heating may be controlled at will.

182. In an electric metal working machine having a press and means for supplying heating current to the work, the combination of a mastershaft controlling the cycle of operations of the machine, means for automatically stopping said mastershaft at an intermediate stage of the actions at which heating takes place and before the press is operated and means controllable by the operator for restarting the machine to cause it to resume its cycle of operations and bring the press into operation, whereby the operator may govern the total period of heating at will.

183. In an electric metal working machine, the combination of a press and means for supplying heating current to the work, a mastershaft controlling the operation of the press and said means, means for automatically stopping said mastershaft at the beginning of the heating period and means controllable at will for restarting the shaft to bring the press into operation, thereby permitting the operator to govern the total period of heating.

184. In an electric metal working machine, the combination of means for supplying heating current to the work, a mastershaft controlling the operation of said means, means for automatically stopping said mastershaft at the beginning of the heating period and means controllable by the operator for restarting the mastershaft and stopping the flow of heating current whereby the amount of heating of the work may be governed at will.

185. In an electric metal working machine, the combination with power operated mechanism through which current is supplied to the work, of means for automatically bringing the same to rest at an intermediate stage of its action, and means for restarting said mechanism from such position of rest at will.

186. In an electric metal working machine, the combination with mechanisms operating in a cycle, of a mastershaft controlling the cycle, means for automatically bringing the shaft to rest at a predetermined point in the cycle and means for restarting said shaft at will from said position of rest.

187. In an electric metal working apparatus, the combination of a work holder for holding the work during heating, an electrode mounted on a carriage and adapted to move transversely to the line of travel of said carriage, a cam shaft and intermediate mechanism for actuating the carriage to bring the electrode into position opposite the work in the work holder and then causing said electrode to move transversely to engage the work.

188. In an electric metal working apparatus, the combination of a mastershaft, means controlled thereby and through which heating current is supplied to the work, a press, means controlled by the mastershaft for automatically bringing the press into action after the heating, means for bringing the mastershaft automatically to rest after the operation of the press and means for restarting the mastershaft at will to permit reheating.

189. In an electric metal working apparatus, the combination with power operated mechanism through which heating current is supplied to the work, of a mastershaft controlling the action of the same twice in the cycle of actions of said shaft, a press and means controlled by said shaft for automatically bringing said press into operation at an intermediate stage of the cycle.

190. In an electric metal working machine, the combination with mechanism through which heating current is supplied to the work and a press for operating on the heated work, of means for automatically bringing said mechanism into operation twice in the cycle of actions of the machine and means for automatically bringing the press into action at an intermediate stage between heating periods.

191. In an electric metal working machine, the combination with power operated mechanism through which current is supplied to the work, of a mastershaft and means controlled thereby for bringing said mechanism into operation twice in the cycle of actions of said shaft, means for automatically bringing said shaft to rest at an intermediate stage between positions in which heating current may be supplied and means for restarting said shaft at will.

Signed at Lynn, in the county of Essex and State of Mass. this 20th day of March A. D. 1907.

ADOLPH F. RIETZEL.
GEORGE E. BARSTOW.

Witnesses:
  GEO. W. H. CHADWELL,
  ARTHUR L. USHER.